(12) United States Patent
Butka et al.

(10) Patent No.: US 7,047,106 B2
(45) Date of Patent: May 16, 2006

(54) STORAGE CELL MOUNTING AND ALIGNMENT FOR CARTRIDGE SYSTEM LIBRARIES

(75) Inventors: David John Butka, Tucson, AZ (US);
Steven Lloyd Felde, Tucson, AZ (US);
Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/109,711

(22) Filed: Jul. 28, 2004

(65) Prior Publication Data

US 2004/0236465 A1  Nov. 25, 2004

Related U.S. Application Data

(63) Continuation of application No. 09/713,336, filed on Nov. 16, 2000, now abandoned.

(51) Int. Cl.
*G06F 19/00* (2006.01)
(52) U.S. Cl. ............. 700/245; 369/30.39; 707/204
(58) Field of Classification Search ......... 700/214, 700/215, 218, 245, 259; 360/92, 69; 369/30.39, 369/30.41, 30.49; 711/112, 114, 156; 707/1, 707/204; 211/41.12, 184; 414/275
See application file for complete search history.

(56) References Cited

U.S. PATENT DOCUMENTS

| | | | | |
|---|---|---|---|---|
| 5,303,034 A | * | 4/1994 | Carmichael et al. | 356/620 |
| 5,423,018 A | * | 6/1995 | Dang et al. | 711/159 |
| 5,870,732 A | * | 2/1999 | Fisher et al. | 707/1 |
| 6,247,096 B1 | * | 6/2001 | Fisher et al. | 711/114 |
| 6,304,798 B1 | * | 10/2001 | Carpenter | 700/258 |
| 6,327,519 B1 | * | 12/2001 | Ostwald et al. | 700/245 |
| 6,336,163 B1 | * | 1/2002 | Brewer et al. | 711/112 |
| 6,445,651 B1 | * | 9/2002 | Felde et al. | 369/30.41 |
| 6,480,759 B1 | * | 11/2002 | Ostwald et al. | 700/245 |
| 6,484,065 B1 | * | 11/2002 | Yu et al. | 700/121 |
| 6,512,963 B1 | * | 1/2003 | Felde et al. | 700/215 |
| 6,535,792 B1 | * | 3/2003 | Carpenter | 700/258 |
| 6,549,358 B1 | * | 4/2003 | Billy et al. | 360/69 |

* cited by examiner

OTHER PUBLICATIONS

Robinson, A mass storage subsystem using ANSI X3B6 1D-1 recocoders, 1990, IEEE, p. 43-45.*

*Primary Examiner*—Yonel Beaulieu
*Assistant Examiner*—McDieunel Marc
(74) *Attorney, Agent, or Firm*—Dale F. Regelman

(57) ABSTRACT

In a mass storage library, a module storage array includes a back plate having "T" shaped apertures patterned to form a cartridge storage together with cell blocks that have "T" shaped protrusions to fit into the openings in the back plate. A column of cell blocks are held in place between a shelf and a spring load. Interlocking surfaces molded into the cell blocks assist in holding the column of cell blocks in place with the "T" shaped protrusions and openings in the back plate. The cell blocks are stacked on the shelf with the "T" shaped protrusions inserted into the openings in the back plate and their mating surfaces interlocked. The spring load clamps the cell against the shelf. The cell blocks form cavities that hold the cartridges in the storage array. A plurality of columns of cell blocks provide the complete storage array. Calibration targets are provided to align the cell blocks to the library accessor and reader. One strip the length of the storage cell stack contains a bar-code viewable through each cartridge storage cell and scannable by an accessor scanner to identify the individual cell blocks.

27 Claims, 18 Drawing Sheets

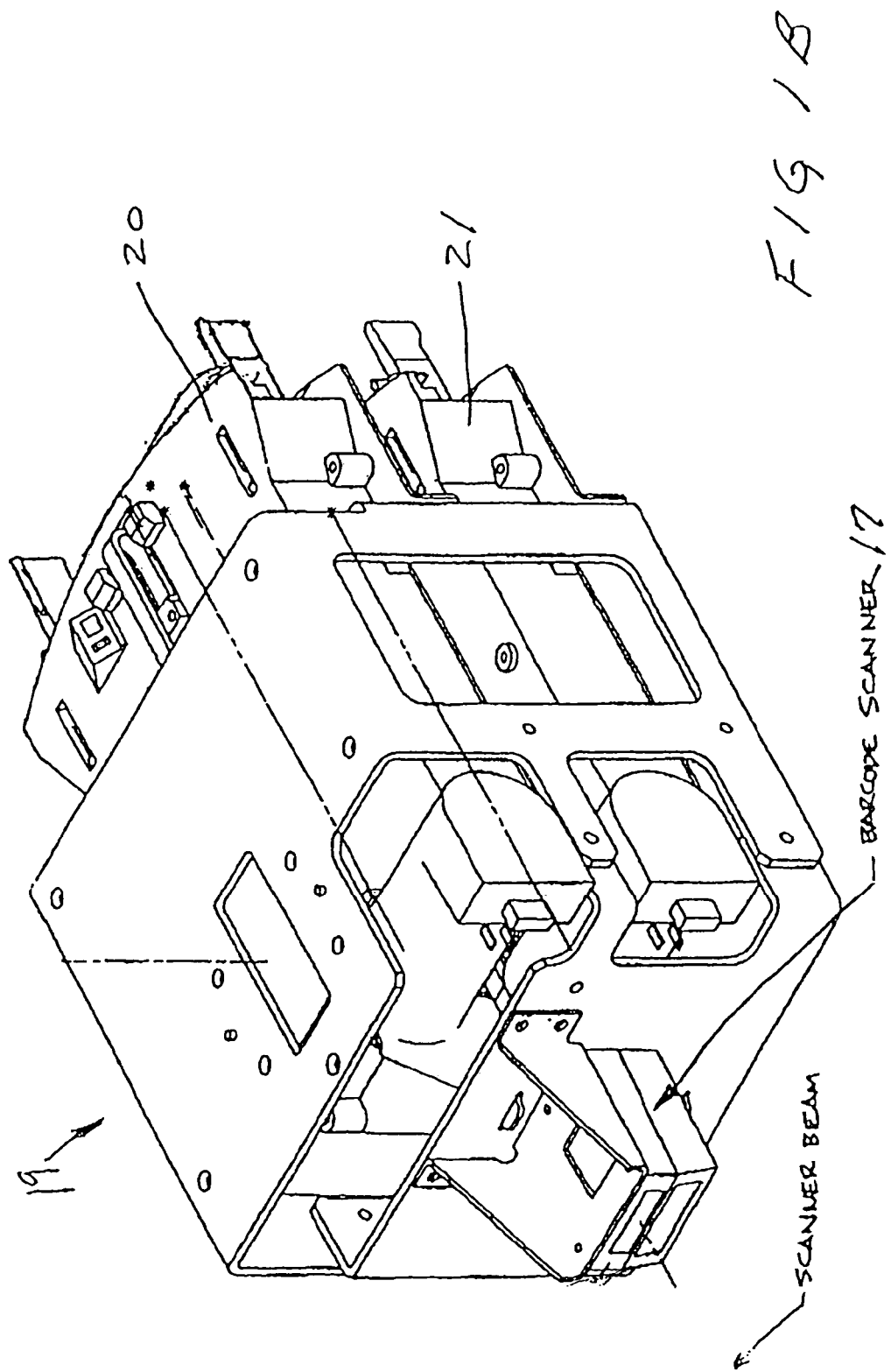

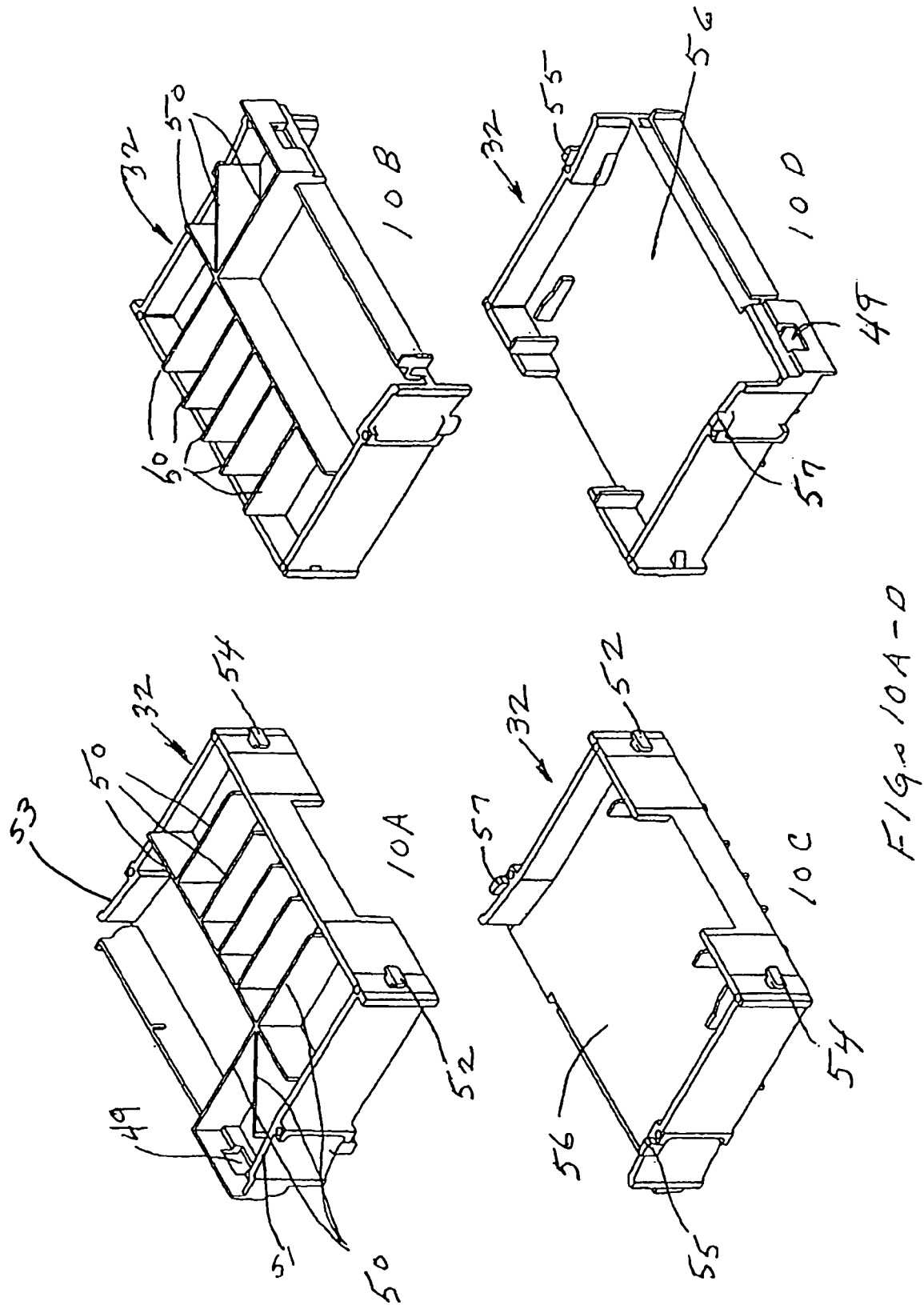

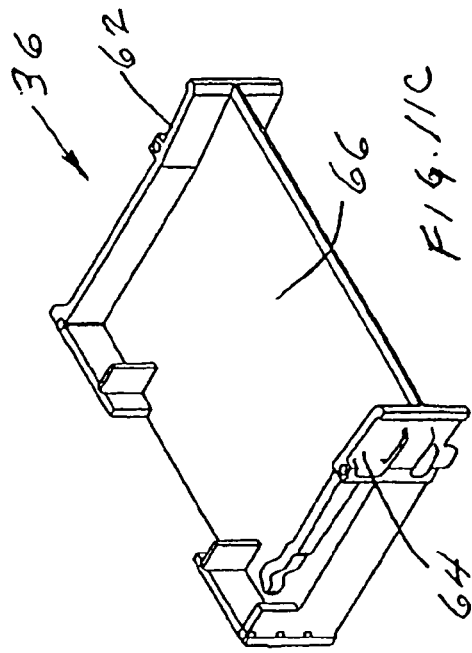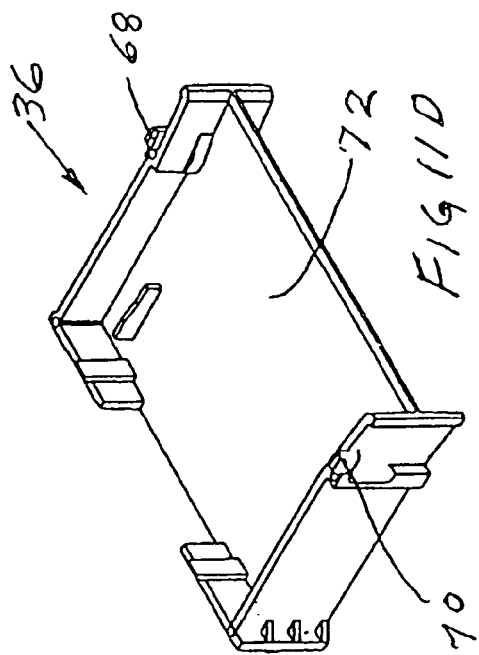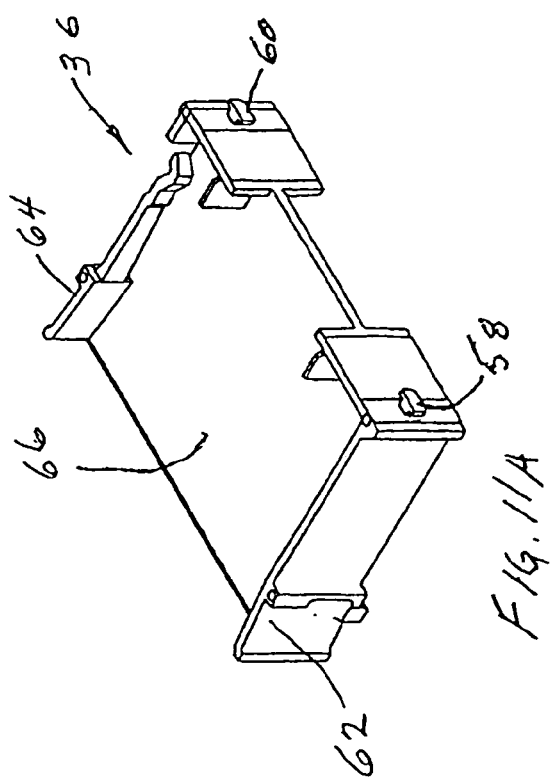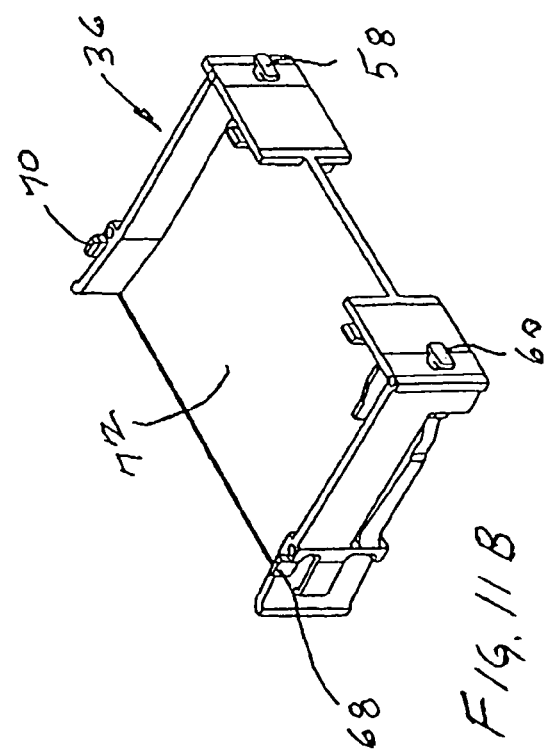

STORAGE CELL MOUNTING AND ALIGNMENT FOR CARTRIDGE SYSTEM LIBRARIES

RELATED APPLICATIONS

This application is a Continuation application of the Parent application having Ser. No. 09/713,336 filed on Nov. 16, 2000 now abandoned.

FIELD OF THE INVENTION

This invention relates generally to an information storage library and more specifically to the mounting and alignment of storage cells used in information storage libraries.

BACKGROUND OF THE INVENTION

Information storage libraries require that the alignment between the storage cells of the libraries that hold the data cartridges and the gripper mechanism used in the robotic systems must be held within narrow tolerances. The arrays of storage cells are generally bolted to the frame work. The accuracy achievable with just a simple bolting is severely limited. This results in misalignment between the robotic gripper and the cartridge in the cells. Further, the array of storage cells may distort from its nominal rectangular shape. Often the location of every cell in the array is in error by a considerable amount and thus the storage cell to robotic gripper accuracy is not achieved.

Some prior art systems solved the alignment problem by placing a distinctive mark on the corners of the storage cells and then using a video camera to provide feedback to the accessor and especially the robotic gripper to achieve the correct location for each storage cell. This solution is extremely costly in that the robotic gripper must carry a video camera. Then the camera has to be maintained in alignment with the robotic gripper so the relationship between the image transmitted and the actual gripper position is true. It is then required to process the image and create an error function which is then used to guide the robotic gripper. With this solution, it is a matter of replacing one alignment problem with a second and neither result in a completely accurate positioning between the robotic gripper and the cartridge stored in the storage cell. There is presently no known arrangement for conveniently mounting storage cells in an information library system that enables easy and correct alignment between the storage cells and the robotic gripper and that enables accurate alignment and easy installation of the storage cells into the library.

It is, therefore, an object of the present invention to provide an enhanced storage cell mounting for information storage libraries.

Another object of the present invention, therefore, is to provide a mounting for storage cells that is easy to assemble while providing accurate alignment between the storage cells and the robotic gripper of the assessor.

There is an ongoing need for an easy mount of an array of cartridge storage cells that can be built and maintained correctly at a low cost while providing simple calibration of the array of storage cells that is sufficient in predicting the location of every cell in the array by the robotic picker.

SUMMARY OF THE INVENTION

These and other objects of the present invention are achieved by providing an automated storage library having a media storage module or cell array system for a plurality of data cartridges, at least one drive mechanism and a robotic accessor transport mechanism including a picker for moving the cartridges between the drives and the storage cell array area. In this invention, a back plane of each storage cell array is a single sheet of metal larger than the storage cell array. Into this metal sheet is punched a series of "T" shaped holes, two for every cartridge storage cell within the array. Each of the storage cells is mounted onto the back plane and include two "T" shaped protrusions. The "T" shaped protrusions clip into the "T" shaped holes of the back plane. The storage cells are mounted vertically and firmly fastened into the frame of the library storage.

One storage cell array includes at least one column of storage cell blocks and generally a plurality of such columns. The storage cell blocks sit and interlock one upon another to form the column of storage cells. Each column is supported by a horizontal shelf fastened to the back plane. The cell blocks are guided laterally and held into a single vertical plane by the "T" shaped holes in the back plane. The top of each column of storage cell blocks is held firmly in place by a resilient means such as a spring. Calibration targets may be added to the top and bottom cells of the cartridge cell block columns and to the front face of the tape drive so that the exact edges of the columns of the storage cell arrays and the exact locations of the drive can be accurately and quickly determined by the robotic accessor and its gripper assembly. A single stripe of material containing an identifying code for each cell in each column of cell blocks may be fastened to the back plane to identify cell blocks not containing a cartridge.

The foregoing and other features and advantages of the invention will be apparent from the following more particular description of the preferred embodiment of the invention, as illustrated in the accompanying drawings.

BRIEF DESCRIPTION OF THE DRAWINGS

FIG. 1B is a perspective view of the picker 19 of FIG. 1A;

FIGS. 10A to 10D are perspective views of the top and bottom storage cell as shown in FIG. 5;

FIGS. 11A to 11D are perspective views of the middle storage cells which are positioned between the top and bottom storage cells of FIGS. 10A to 10D as shown in FIG. 8;

DETAILED DESCRIPTION OF THE INVENTION

Referring to the illustrations, like numerals correspond to like parts depicted in the figure. The invention will be described as embodied in an automated magnetic tape library storage subsystem for use in a data processing environment. Although the invention shown uses magnetic tape cartridges, one skilled in the art will recognize that the invention equally applies to optical disk cartridges or other removable storage media. Furthermore, the description of an automated magnetic tape storage system is not meant to limit the invention to data processing applications as the invention herein can be applied to storage and cassette handling systems in general.

Figure 1:
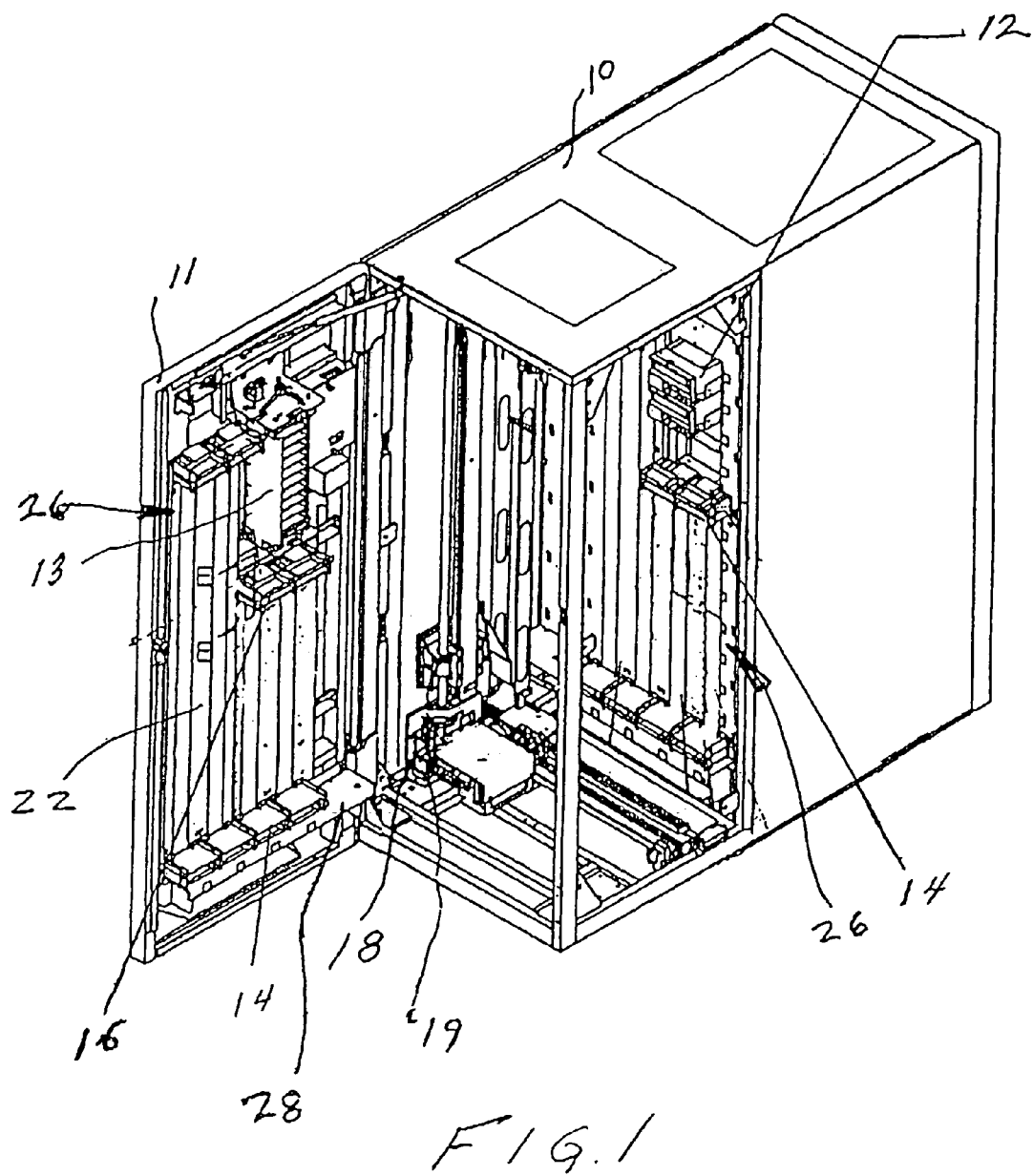
FIG. 1 is a perspective view of an automated storage and retrieval data processing library employing the storage cell mounting means of the present invention.
Figure 1A:
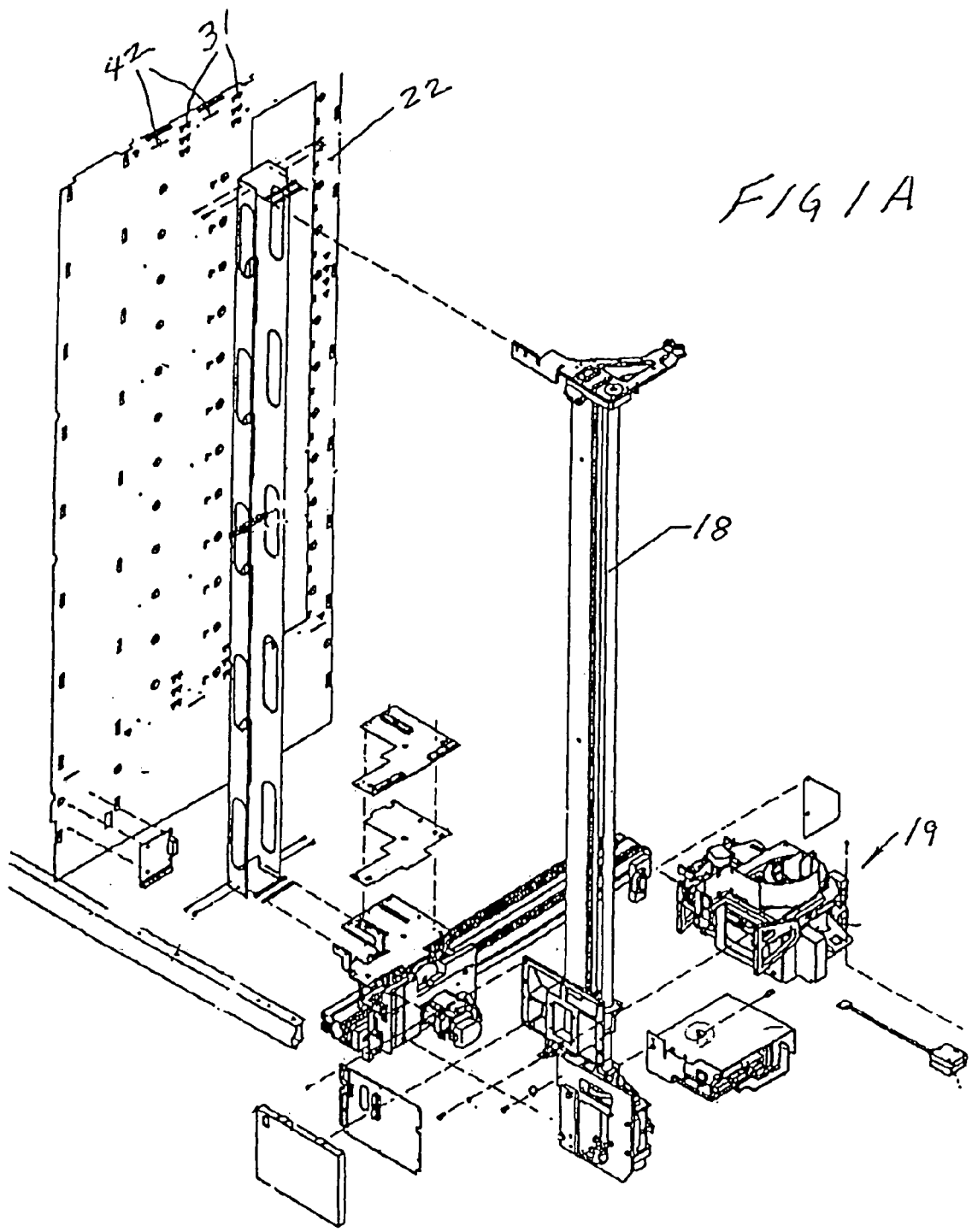
FIG. 1A is an exploded view of the accessor 18 of FIG. 1.

FIG. 1 is a perspective view of one type of an automated information storage and retrieval library 10 employing an input/output station 13 mounted on a door 11. The library 10 includes one or more data recorder modules or drives 12, a plurality of cartridges 14 stored in a bank of cavities comprising storage cells 16 and forming a storage module, an accessor 18 for transporting a selected cartridge between a storage cell and a drive 12, see FIG. 1A. The accessor 18 includes a cartridge picker 19. The accessor 18 can access a cartridge either from the storage cells 16 or from the input/output station 13. Only a few cartridges 14 and storage cells 16 are shown. It should be noted that the entire open section of the library 10 in operation is generally completely lined with storage cells 16 each containing one cartridge 14 and comprising several storage cell mounting arrays 26. Each storage cell 16 is fastened to the back plate 22. Columns of storage cells 16 rest on a shelf 28 as will be described further.

The drives 12 can be optical disk drives or magnetic tape drives and the cartridge can contain optical or magnetic media, respectively. The storage cells 16 are supported by the mounted plate 22 to hold the cartridges 14 in correct alignment with the cartridge picker 19 of the accessor 18 (see FIG. 1A) and also in alignment with the drives 12. The library 10 also includes a library data director or controller that connects with, and controls the actions of the drives 12 and the accessor 18.

FIG. 1B shows the picker mechanism 19 with two gripper mechanisms 20 and 21. A bar-code scanner 17 is shown mounted to the picker 19. The scanner 17 is used to scan the bar-code identifying marks for an empty cartridge storage cell 16 as shown in FIGS. 4–6 and discussed later.

Figure 2:
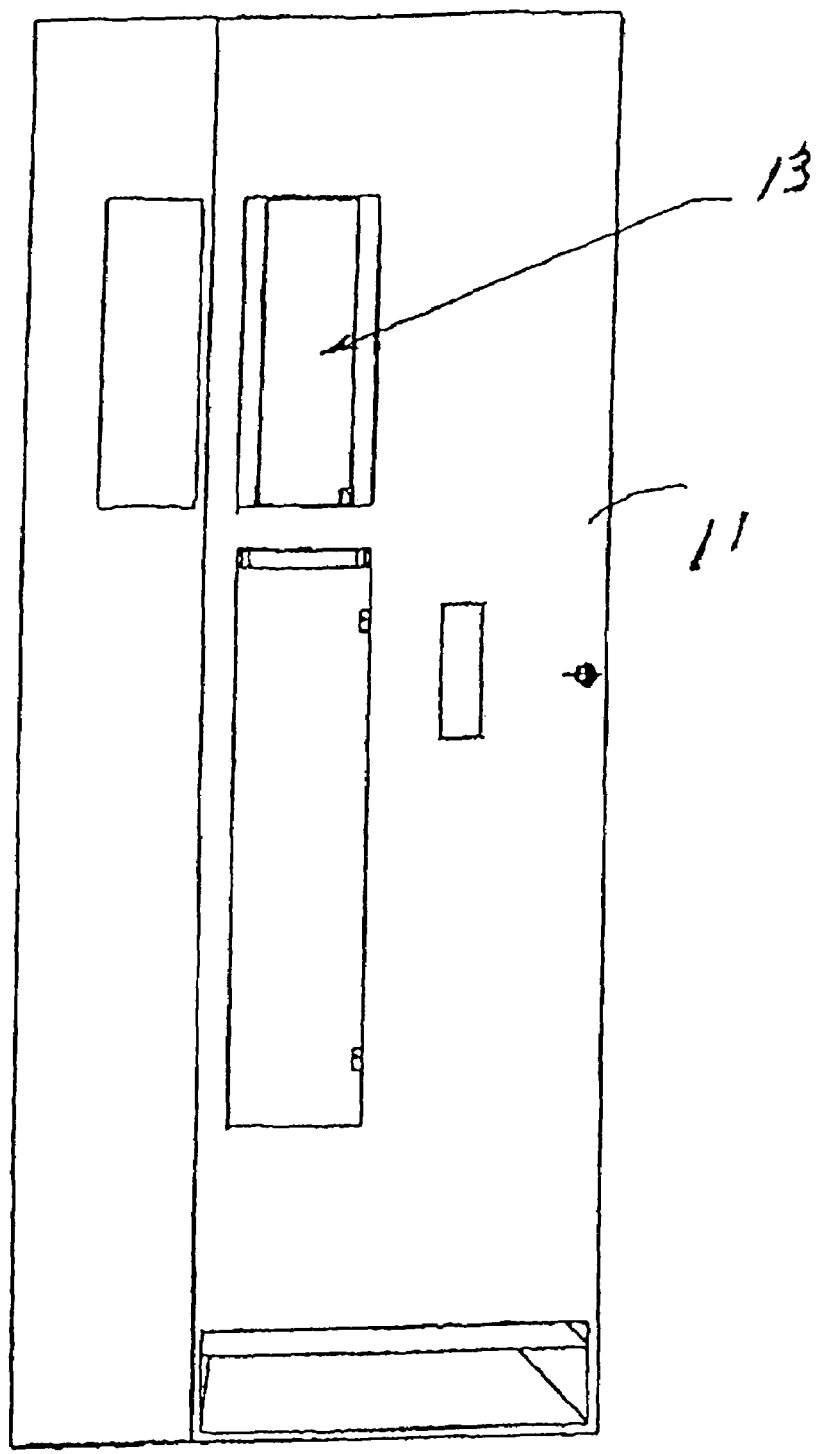
FIG. 2 is a frontal view of the library system of FIG. 1.

FIG. 2 shows a frontal view of the library system 10 with the input/output station 13 positioned for easy access by an operator to input cartridges required by the library system and to remove cartridges after the reading and/or writing of the media in the cartridges is completed. The input/output station 13 is shown positioned next to the mounting plate 22, see FIG. 1, which, together with the storage cells 16, form one of a plurality of storage cell mounting arrays 26. The controller, which includes at least one computing processor, is further interconnected with a host processor from which it receives access commands. Information to be recorded on, or to be read from, selected cartridges 14 is transmitted between the drives 12 and the host through the library controller or directly between the drives 12 and the host. The storage cell mounting array 26 of the present invention includes the mounting plate 22 and the storage cells 16 and is shown in FIGS. 3, 4 and 5.

Figure 3:
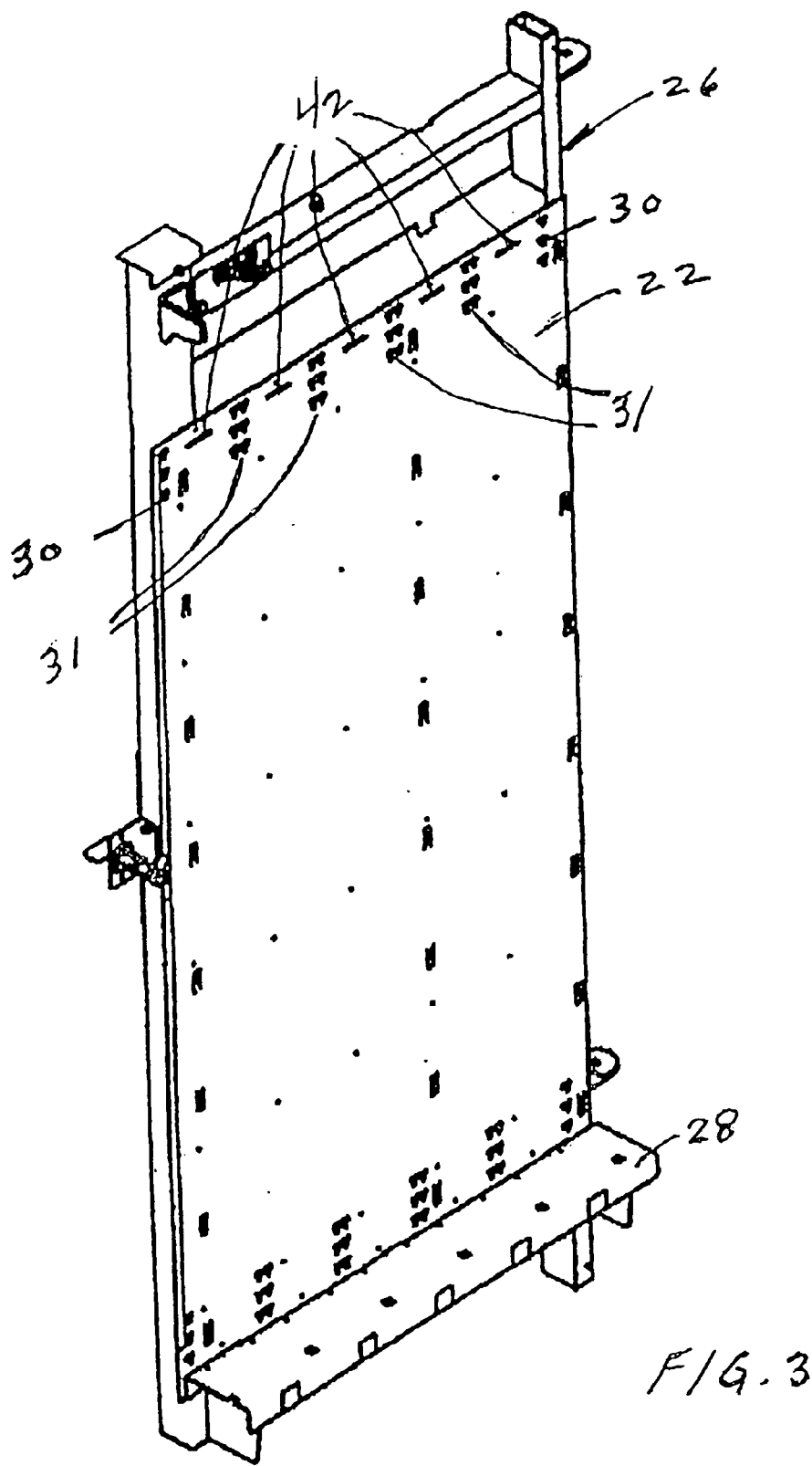
FIG. 3 is a perspective illustration of a storage cell mount according to the present invention.
Figure 4:
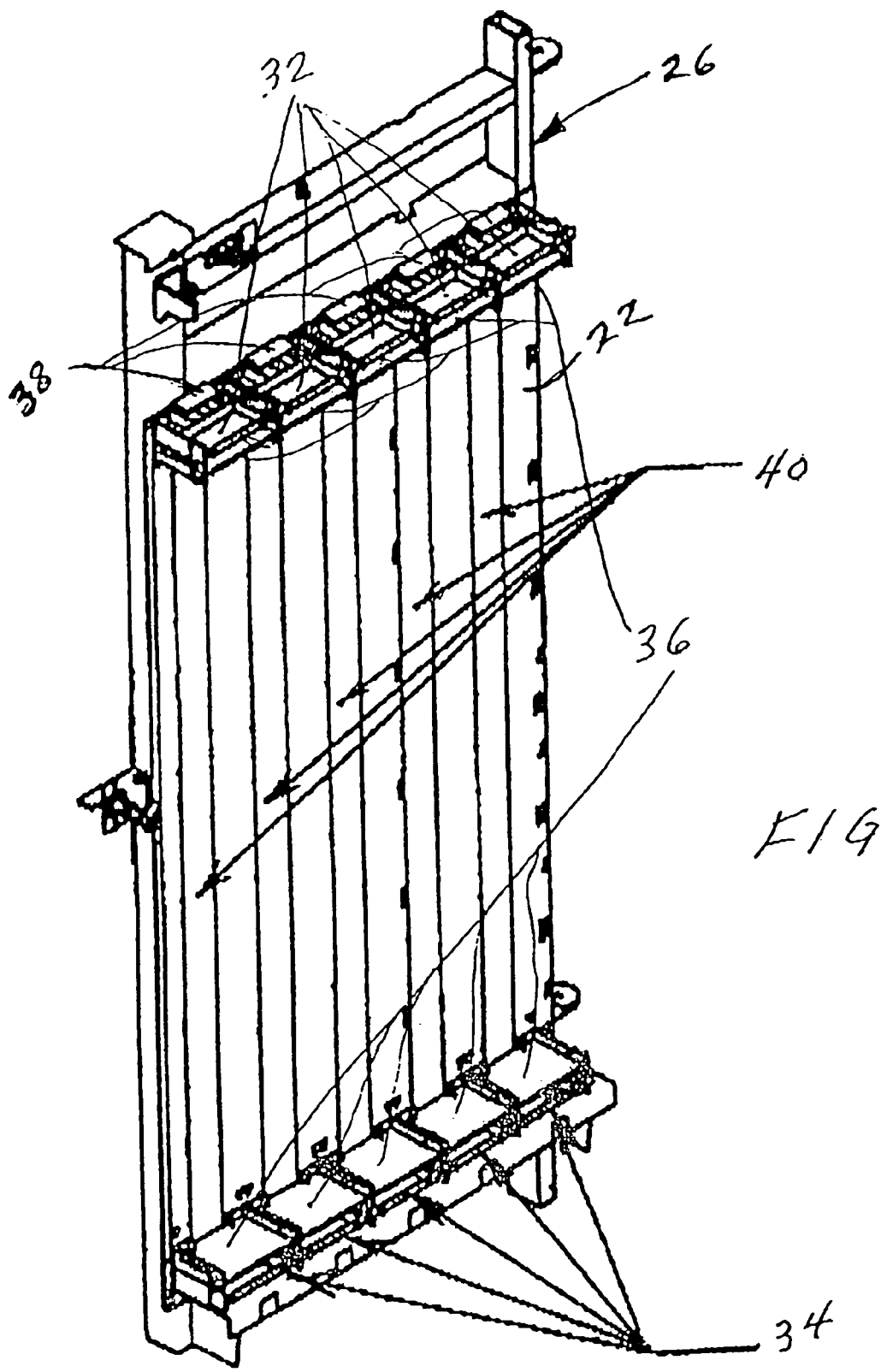
FIG. 4 is a perspective view of the mount of FIG. 3 including several storage cells and bar-code label stripes.
Figure 5:
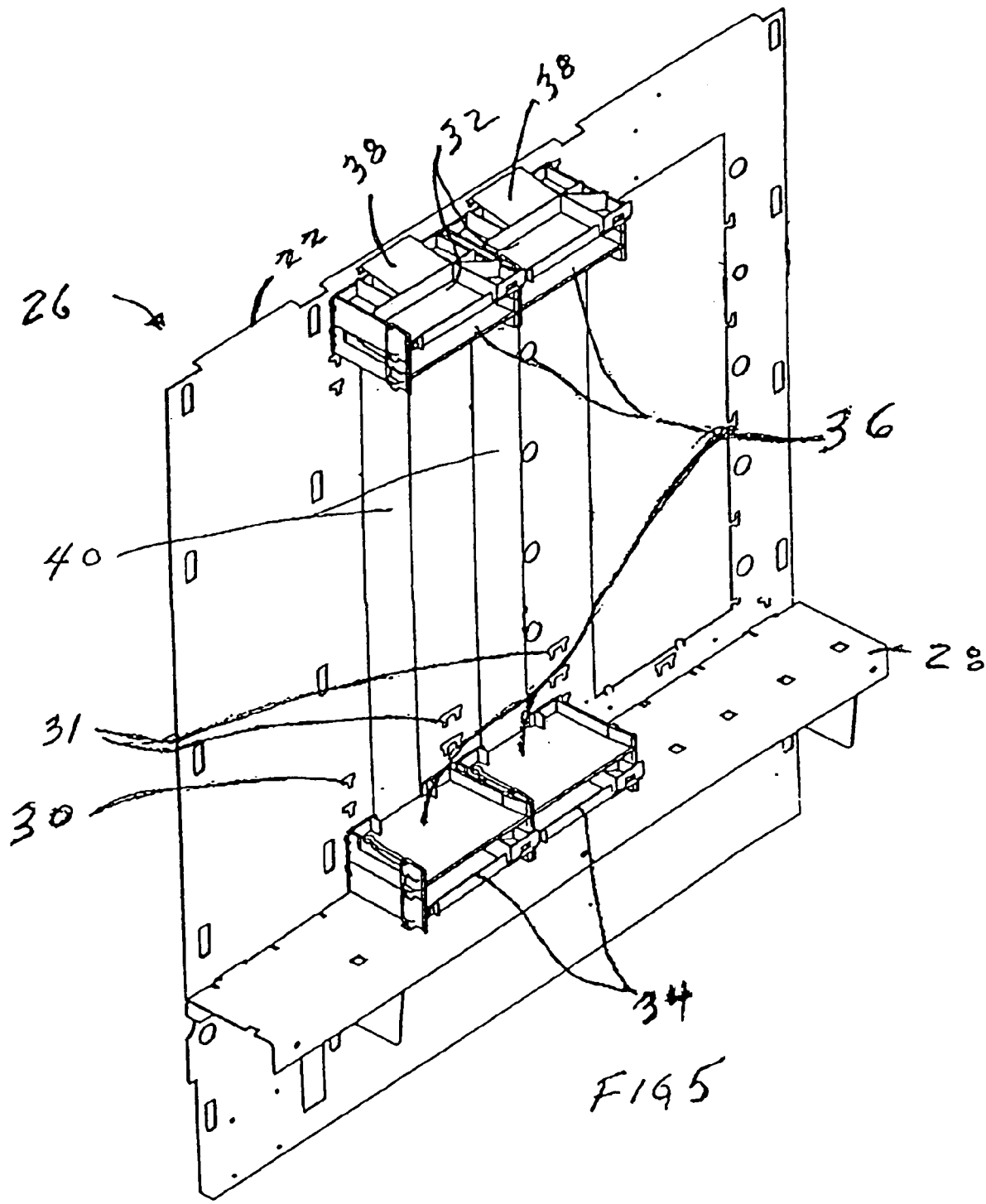
FIG. 5 is a perspective view of a close-up of FIG. 4.

Referring now to FIGS. 3, 4 and 5, the storage cell mounting array 26 is shown as including the back or mounting plate 22 with some of the storage cell blocks mounted to the back plate 22. The back plate 22 includes the shelf 28 supporting the bottom array of storage cell blocks. A plurality of essentially "T" shaped openings 30 and 31 are formed in the back plate 22 to support the storage cell blocks. The storage cell blocks include a top cell block 32 and a bottom cell block 34. The top and bottom cell blocks 32 and 34 are the same and will be discussed later with respect to FIGS. 10A to 10D. The storage cell blocks also include a series of intermediate cell blocks 36 that comprise the remaining storage cell blocks mounted between the top cell block 32 and the bottom cell block 34. The intermediate cell blocks 36 are further discussed later for FIGS. 11A to 11D. Resilient means shown as springs 38 press against the top cell blocks 32 and hold all of the storage cell blocks against the shelf 28. Continuous bar-code label stripes 40 are provided as shown in FIGS. 4 and 6, one stripe 40 for each column of storage cell blocks 32, 34 and 36. Each continuous stripe 40 includes a bar-code or similar identifying markings 41.

Figure 6:
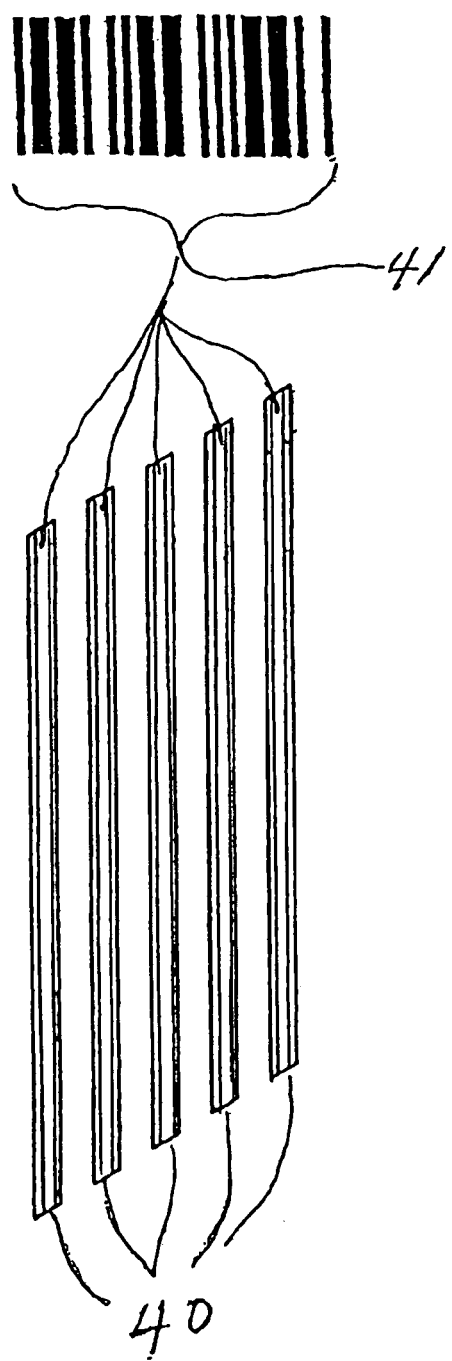
FIG. 6 is a perspective view of the label stripes of FIG. 4 with bar-code markings.

In FIG. 6, five label stripes 40 are shown. The five stripes 40 would cover five columns of cell blocks (see FIG. 4) for one storage cell mounting array 26. Each continuous stripe 40 includes a code marking 41 extending the entire length of each stripe 40. The code marking 41 is viewable through each of the cell blocks in each column. The single stripe 40 and the single code marking 41 on each stripe 40 replaces the separate pieces for each cell block as required in the prior art. In the preferred embodiment, the code marking 41 is a bar-code arrangement as shown in FIG. 6. A front view of the back panel 22 of the storage cell mounting array 26 without the storage cell blocks is shown in FIG. 7.

Figure 7:
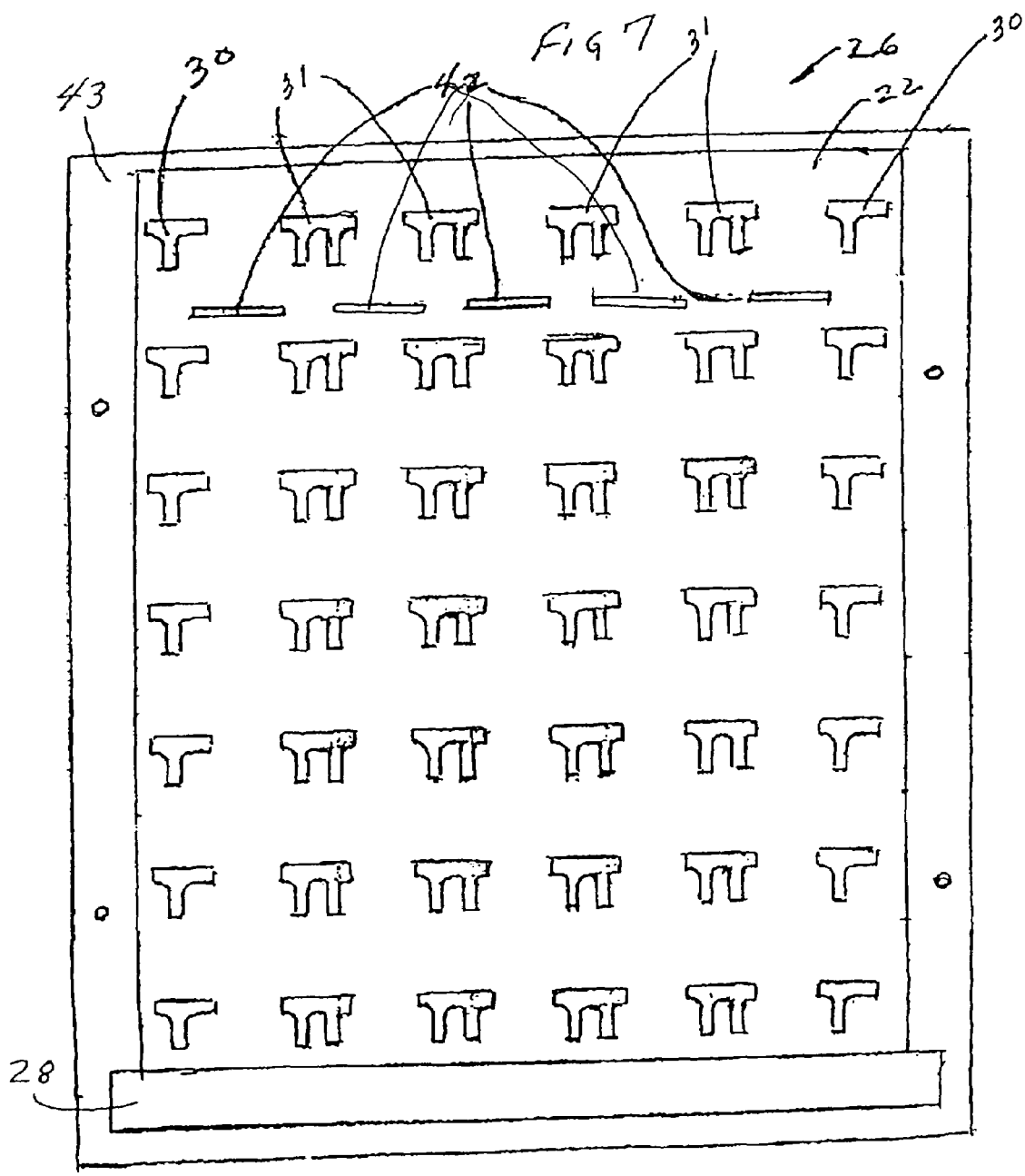
FIG. 7 is a frontal view of the mounting plate including "T" shaped apertures for the storage cells.

Referring how to FIG. 7, the storage cell mounting array 26 shows the back plate 22 and the positioning of the shelf 28 with respect to the "T" shaped openings 30 and 31. Slots 42 are provided in the back plate mounting means 22. The slots 42 support one end of the springs 38 (see FIG. 4), with the other end of the springs 38 pressing against the top cell block 32. Further discussion of the placement of the springs 38 in relation to the back plate 22 will be given later when the framework 43 is discussed in relation to FIG. 8.

The back plate 22 of the storage cell mounting array 26 is a single sheet of metal larger than the storage cell array 26. Into this back plate 22 is punched a series of single "T" shaped aperture or holes 30 and double "TT" shaped holes 31. The single "T" shaped holes 30 are spaced along the outer vertical edges of the back plate 22 and hold the outside column of the storage cells structure. The double "TT" shaped holes 31 form the inside columns of the storage cells with each "T" of the double "TT" shaped holes 31 supporting one edge of the storage cell structure. Thus, each double "TT" shaped holes support one edge of two storage cells structures. Further discussion of the holes 30 and 31 will be given later when the building of the back plate 22 to support the storage cell mounting array 26 is given.

The back plate 22 also supports the shelf 28 which in turn will support the storage cell blocks when the storage array 26 is mounted vertically into the library storage frame. The back plate 22 can be firmly mounted onto the library storage frame by welding, for instance, to the framework 43. The punching of all of the openings in the back plate 22 such as the "T" shaped openings 30 and 31 and the slots 42 and the mounting of the shelf 28 can be done very accurately on a numerically controlled punch system, for instance, at the time of manufacture. Each of the storage cell blocks to be mounted onto the back plane 22 has two "T" shaped protrusions on the back of each storage cell block that clip into the back plate "T" shaped openings 30 and 31. This provides the lateral location for the storage cells. The storage cell blocks sit and interlock one upon the other and are supported by the shelf 28 as shown in FIG. 8.

Figure 8:
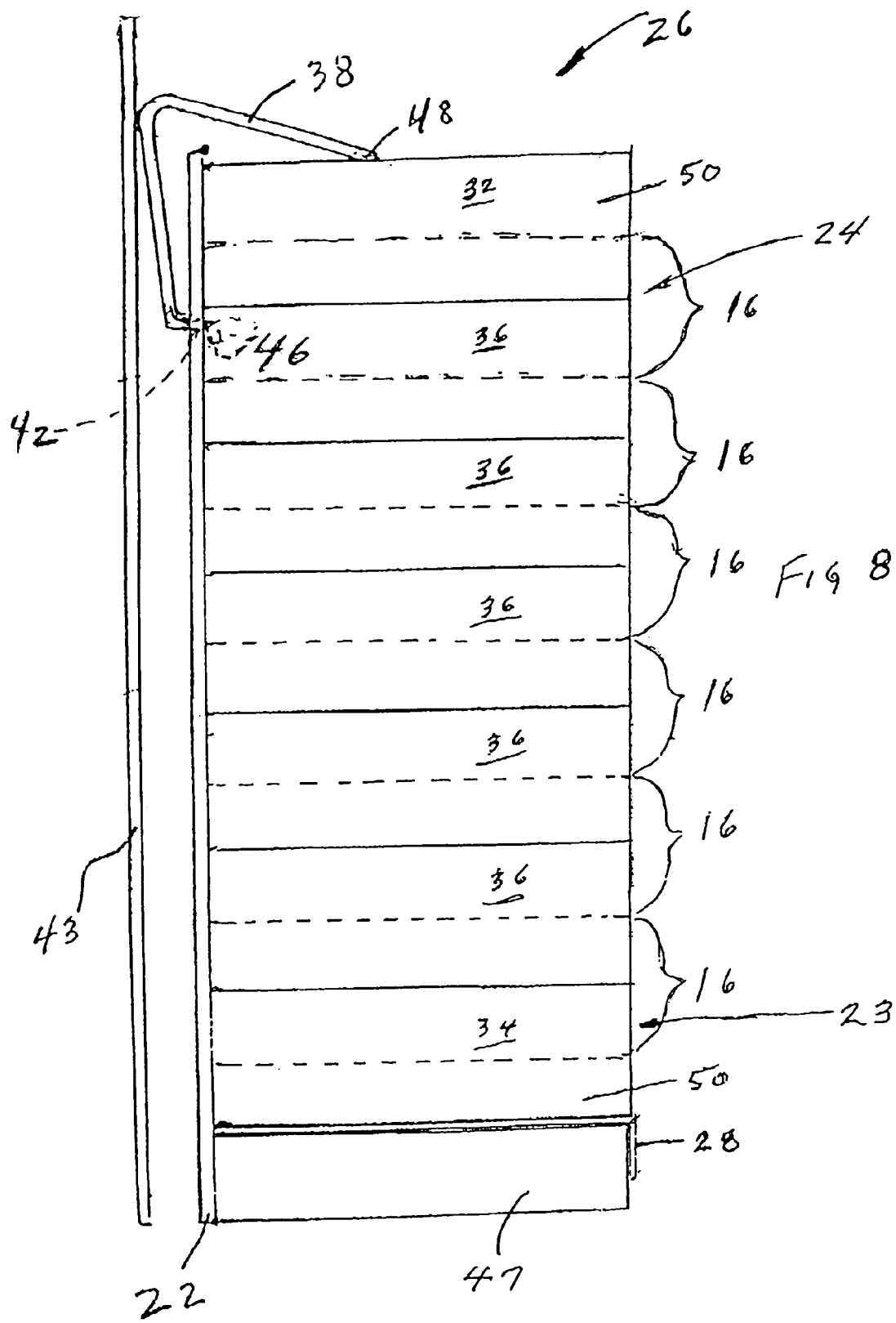
FIG. 8 is a side view of the storage cell mount with the cell blocks.
Figure 9:
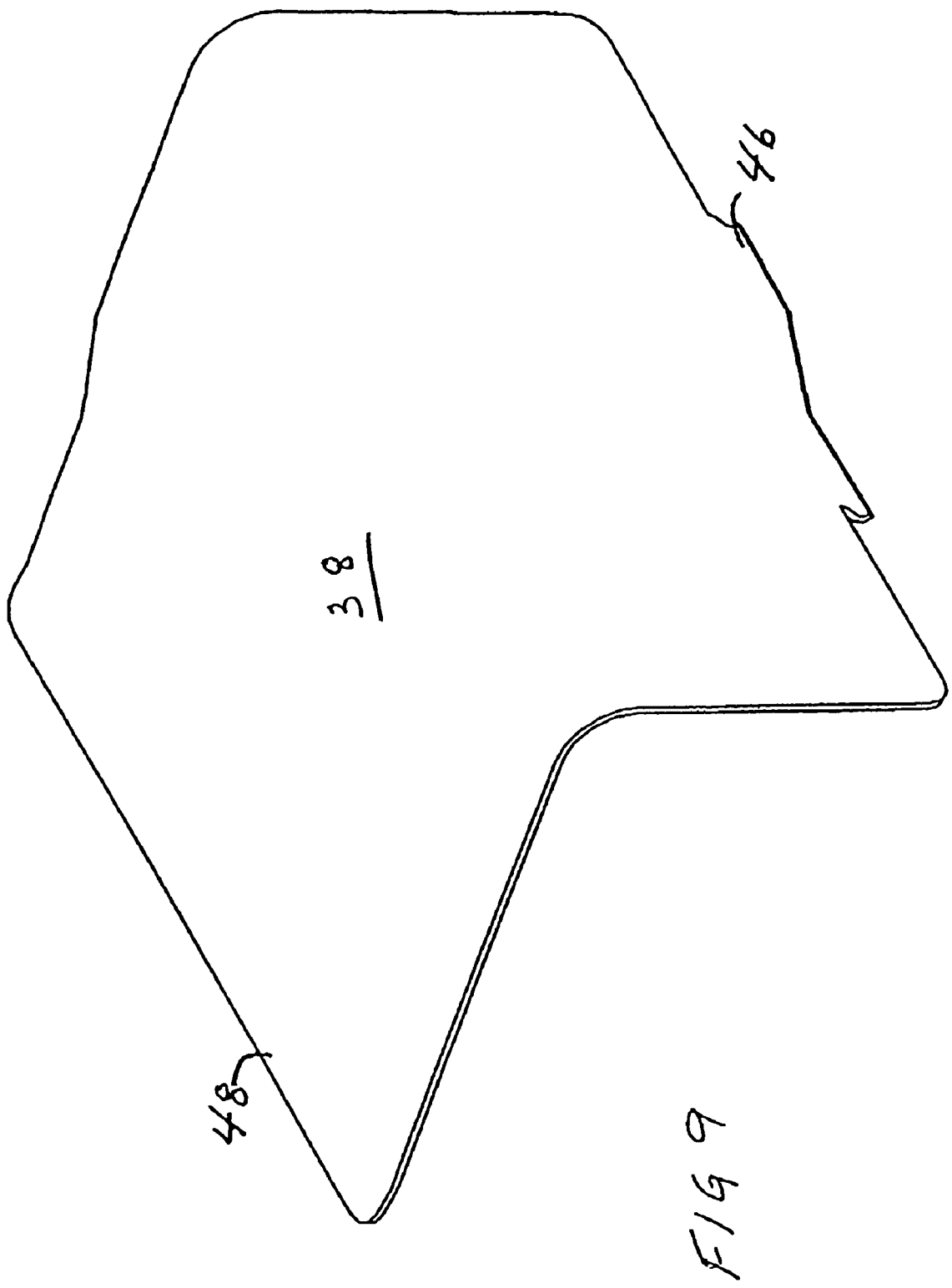
FIG. 9 is a perspective view of the resilient spring means used to hold down the stack of storage cells as shown in FIG. 8.

Referring now to FIG. 8, the storage cell mounting array 26 includes the top cell block 32, the bottom cell block 34, and a plurality of intermediate cell blocks 36 supported between the top cell block 32 and the bottom cell block 34. The bottom cell block 34 in turn is supported by the shelf 28. The shelf 28 is held in position by a shelf support 47 which is firmly fastened to the back plate mounting means 22. The spring 38 is shown pressing against the top cell block 32 while having its lower end protruding through one of the notches shown as slots 42. A detail of the shape of spring 38 is shown in FIG. 9. The framework 43 presses against the spring 38 to provide spring resilient force at the top end 48 against the top cell block 32 thereby holding all of the storage cell blocks 32, 34 and 36 against the shelf 28. The interplay between each of the cell blocks into their supporting blocks and the formation of the storage cells 16 by the cell blocks will be further discussed with the structure of the cell blocks as shown in FIGS. 10A to 10D and FIGS. 11A to 11D. The configuration of the top cell block 32 and the bottom cell block 34 of the storage cell mounting array 26 is shown in FIGS. 10A to 10D. The storage cell block shown in FIGS. 10A to 10D is useful for either the top cell block 32 or the bottom cell block 34 as shown in FIG. 8. FIGS. 10A and 10C show the back perspective view of the top cell block 32 showing the connection to the back plate 22 while FIGS. 10B and 10D show the frontal view of the top cell block 32 as viewed from the accessor 18 or robotics side of the library 10.

FIGS. 10A and 10B show the topside of the top cell block 32 and FIGS. 10C and 10D show the underside of the same cell block. For purposes of this discussion, it will be assumed that the top cell block 32 is being described but it should be understood that the cell block of FIGS. 10A and 10B could equally be the bottom cell block 34. In FIGS. 10A and 10B, the top of cell block 32 has a series of panels 50 which mainly are support structures to provide a structure to allow the spring 38 to apply a force which holds the cell stack against the shelf 28. The storage cell blocks of this construction are of the size and shape to support the tape cartridge. The top cell block 32 includes two "T" shaped protrusions 52 and 54 which are shaped to mate with the "T" shaped openings 30 and 31 of the back panel 22 as shown in FIG. 7. FIGS. 10C and 10D show the underside of the top cell 32. The underside of the top cell block 32 includes an open area 56 that forms a cavity which provides one-half of the sleeve-like construction of the total storage cell that eventually will hold the cartridges 14. There is essentially no difference between the top cell block 32 and the bottom cell block 34, the only difference being is that there is one cell block mounted at the top of the storage cell array 26 (see FIG. 8) against which the spring 38 presses against while the bottom cell block 34 rests on the shelf 28. Supported between the top cell block 32 and bottom cell block 34 are the intermediate cell blocks 36 as shown in FIG. 8. The top and bottom cell blocks 32 and 34 also include a calibration target 49 which will be discussed later. The structure of the intermediate cell blocks 36 are shown in FIGS. 11A to 11D.

FIG. 11A shows the topside of the intermediate storage block 36 while FIG. 11B shows the bottom side of the same intermediate cell block 36, both views from the back side. The intermediate cell blocks 36 likewise include the "T" shaped portions 58 and 60 which are of the same construction to the "T" shaped 52 and 54 of the top cell block 32. The bottom side of the top cell block 32 of FIGS. 10C and 10D includes projections 55 and 57. The top side of the intermediate cell block 36, as shown in FIG. 11A, includes mating locations 62 and 64 which mate with the projections 57 and 55 of the top cell block 32 (as shown in FIG. 10C) as well as the projections 68 and 70 of an adjacent intermediate cell block 36. The intermediate cell block 36 also includes an opening 66 which together with the opening 56 of the top cell block 32 form one storage cell 16. As shown in FIG. 11B, the intermediate cell block 36 also includes projections 68 and 70 and an opening 72. All of the projections on the cell blocks 32, 34, and 36 such as projections 55, 57, 68 and 70 interlock with mating structures of the intermediate blocks 36, such as the mating structures 62 and 64 shown in FIG. 11A. FIGS. 11C and 11D show the underside views of FIGS. 11A and 11B, respectively.

Referring again to FIG. 8 for the building of the storage cell mounting array 26, together with FIGS. 10A to 10D and 11A to 11D, the bottom cell block 34 is placed on the shelf 28 with its support structure panels 50 facing upward with its protrusions 52 and 54 placed into the bottom adjacent "T" shaped openings 30 and 31. The projections 68 and 70 of the first intermediate cell block 36 lock with the mating structure 53 and 51, respectively, of the bottom cell block 34. The second intermediate cell block 36 is placed on the first intermediate cell block with its protrusions also placed into the next higher "T" shaped openings 30 and 31 of the back plate 22 and its projections 68 and 70 mating with the mating structures 64 and 62, respectively, of the first intermediate cell block. The opening 66 of the first intermediate cell block and the opening 72 of the second cell block form a cavity 23 as shown in FIG. 8, which becomes one storage cell 16 of the library 10 of FIG. 1. At the top of the stack, as shown in FIG. 8, the top storage cell 32 is placed on the last intermediate storage cell of the stack again with the projections 55 and 57 (FIG. 10C) mating with the mating surfaces 62 and 64 (FIG. 11A) and its protrusions into the appropriate "T" shaped openings of the back plate 22 thereby forming a cavity 24 which becomes the top storage cell 16 of FIG. 4. The protrusions 52, 54, 58 and 60 of the storage cells lock into the "T" shaped openings 30 and 31 of the back plate 22 to hold the storage cells against the back plate 22 while permitting vertical movement of the stack of storage cells with the clamp spring 38 firmly holding the entire stack in contact with the shelf 28, see FIG. 8.

FIG. 9 shows the shape of the spring 38 together with its lower end 46 and the top end 48. The spring clamp 38 can be made of any resilient material such as spring steel to form the holding structure as shown in FIG. 8.

Referring now to FIG. 3 for an explanation of the construction of the storage cell mounting array 26 according to the present invention. After the back panel mounting means 22 is punched to contain all of the "T" shaped openings 30 and 31 and the slots 42, see FIG. 7, together with the mounting openings for the shelf 28, the shelf 28 and the shelf support 47 (see FIG. 8) are mounted to the back plate 22.

Then the bottom cells 34 are placed onto the shelf 28. The protrusions such as protrusions 52 and 54 of FIG. 10A are locked into the "T" shaped openings 30 and 31. After a row of the bottom cell blocks 34 are placed onto the shelf 28, the first column of intermediate cell blocks 36 are placed on top of the bottom cell block 34. The protrusions 68 and 72 of the intermediate cell block 36 of FIG. 11A then is contacted with the mating structures 51 and 53 of the bottom cell block such as shown in FIG. 10B. The "T" shaped protrusions 58 and 60 of the intermediate cell block 36 mate with the "T" shaped openings 30 and 31. These intermediate cell blocks are then placed one on top of the other until the entire height of the storage cell array is completed. A top cell 32 is placed at the top end such that protrusions 55 and 57 likewise mate with the mating structures 62 and 64 of the intermediate cell 36 which is just underneath the top cell block 32. The spring 38 then has its lower end 46 inserted into the notch 42, see FIG. 7, while the top end of the spring 38 is directed against the top cell block 32 as shown in FIG. 8. Each column of cell blocks from the bottom cell 34 through the intermediate cell blocks 36 to the top cell block 32 form one column of the entire storage cell array. The openings in each of the storage blocks provide one half of the eventual storage cell openings 16 to contain one cartridge 52. The horizontal portion of the "T" shaped openings 30 and 31 provide an easy slot for entering the cell blocks 32, 34 and 36 into the back panel 22 while the vertical portion of the "T" shaped openings 30 and 31 provide a restriction against any horizontal movement of the individual cell blocks. Thus, all of the cell blocks are inserted into the "T" shaped openings 30 and 31 via their "T" shaped protrusions. The bottom cell 34 rests against the shelf 28. The top cell 32 and the intermediate cells 36 are firmly held into position with their "T" slots and "T" shaped protrusions interlocking and all are held firmly down against the shelf 28 by virtue of the springs 38. Each column of cell blocks interlock and are therefore held in perfect alignment in both the vertical and horizontal position thereby providing accurate one time alignment of the storage array. The back plate 22 can be firmly mounted within the library system 10 by welding for instance to retain the accurate cell location for the life of the system.

The height of the storage cell array 26 will vary with not only the manufacturing tolerances of the individual cell blocks 32, 34 and 36 but also with temperature and humidity. This is accommodated by the top of the storage cell array being held down by the spring 38. In this manner the storage cell array can grow and shrink and the individual cell blocks can still be held in close proximity one to the other. The robotic gripper 19 can be programmed to calibrate the location of both the bottom and the top of the storage cell array as will be discussed later. Thus the robotic gripper 19 can compute the exact location of every storage cell 16 despite the manufacturing tolerances and the temperature and humidity variations.

Figure 12:
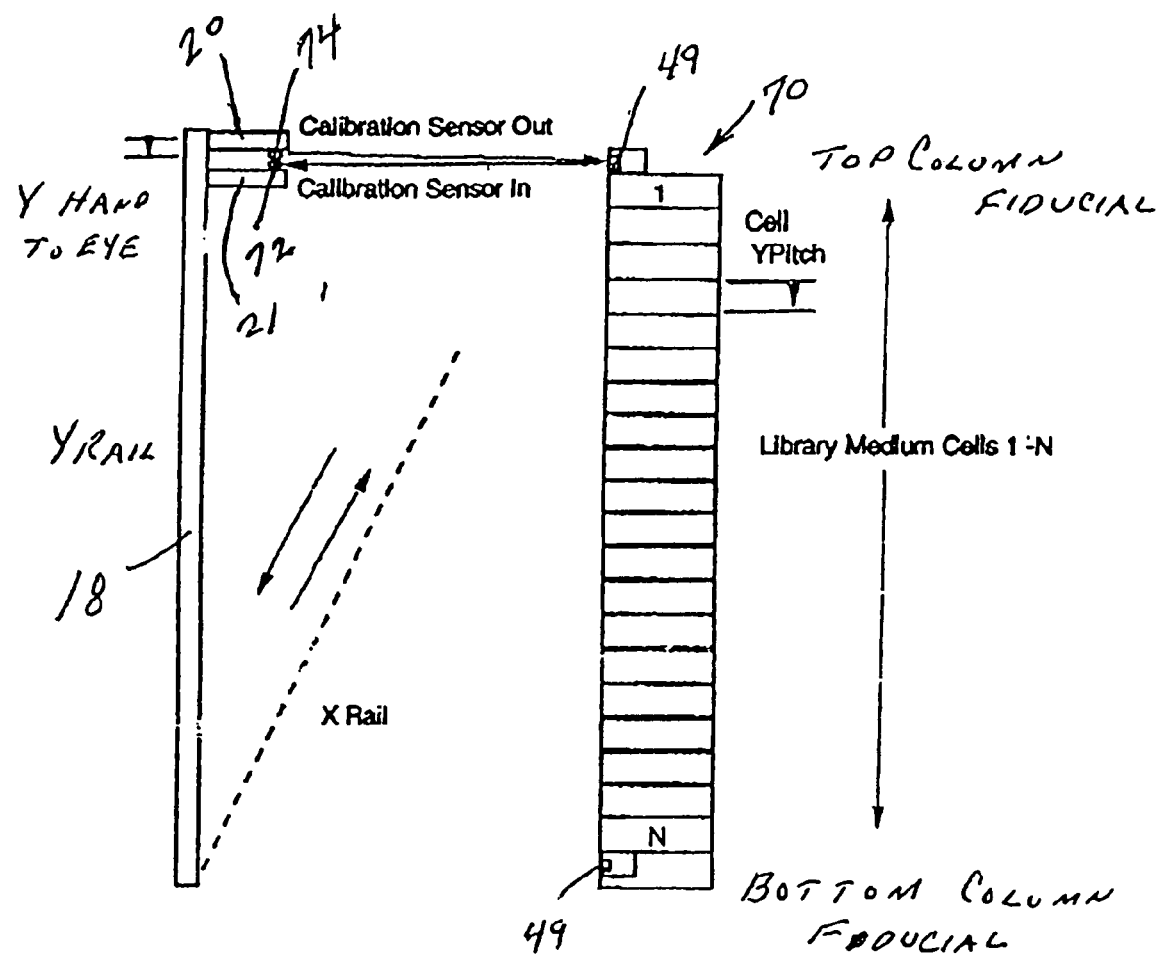
FIG. 12 shows a pictoral representation of the scan mechanism for the storage cell array.

The calibration mechanism for the storage cell alignment is shown in FIGS. 12, 13, 14, 15, and 16. As shown in FIG. 12, the calibration mechanism includes the light emitting structure 74 and the optical sensor 72. Both are mounted between the two gripper mechanisms 20 and 21 of the accessor 18 (see also FIGS. 1A and 1B). The light emitter 74 emits a beam of light towards the calibration target 49 of the cell stack 70. The fiducial or calibration target 49 either returns a reflection that is sensed by the optical sensor 72 or no reflection is returned indicating that the calibration target 49 has been located. A digital response to this signal is used to determine the reflective state of the cell stack 70. Locating the absolute positions of the cartridges in the storage cells in a library requires being able to sense the precise positions of each storage cell in a cell stack and the precise position of the drives for the cartridges. Using a calibration sensor that is mounted on the accessor 18 of the robotics mechanism, the four sides of the calibration target 49 can be determined with precision. The light emitter 74 images a spot of light onto the target fiducial 49 and the optical sensor 72 senses the reflected energy. When over the target 49 which is a hole in the top cell block 32 and the bottom cell block 34, there is no reflected light. The hole to no hole transitions can be precisely determined. Finding the four edges of the target 49 provides the precise location of the center of the target 49.

Figure 13:
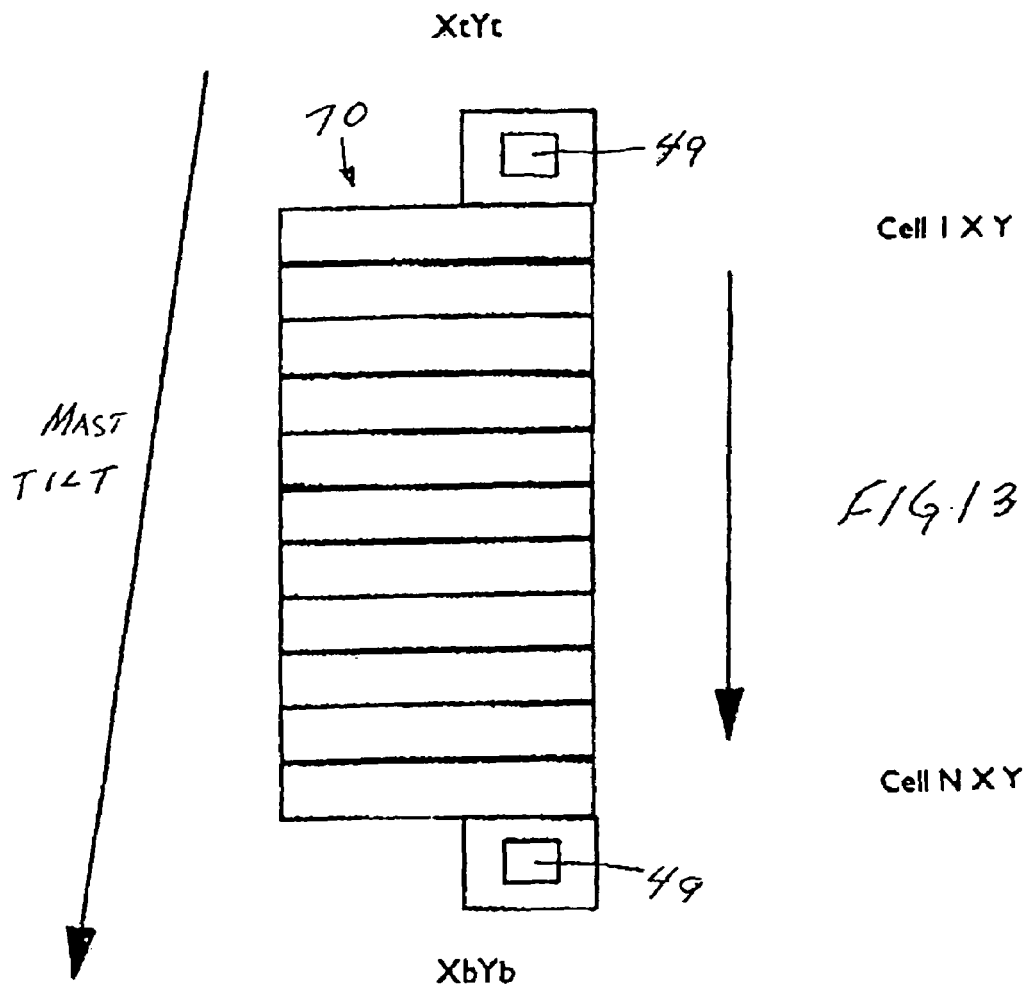
FIG. 13 is a frontal view of a column of storage cells with the alignment fiducials.

Knowing the center of both the top and bottom targets 49 in the X direction, see FIG. 13, the mast tilt of the robotics relative to the cell stack 70 can be determined. Knowing the Y center of both the top and bottom targets 49, the Y location of each cell can be computed. All of the blocks comprising the cell stack, top cell block 32, bottom cell block 34 and intermediate cell blocks 36 are the same height since each are molded. The center of each cell in the cell stack 70 can be calculated and used to position the accessor 18 and the gripper 20 and 21 for a pick or place operation.

Figure 14:
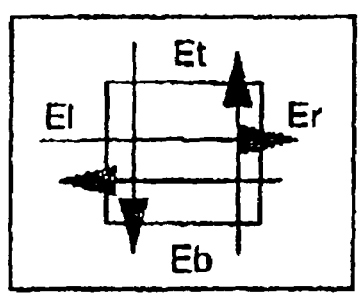
FIG. 14 shows the center calculation alignment fiducial.
Figure 15:
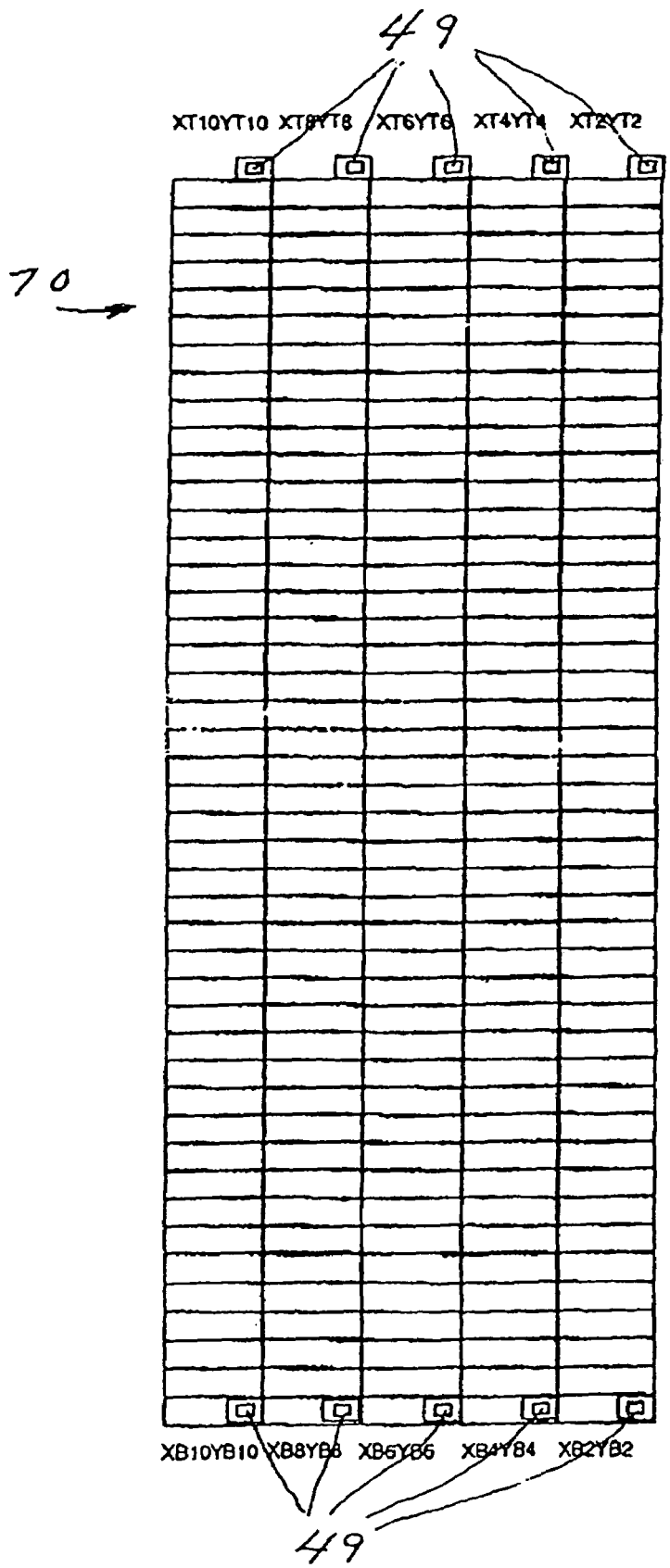
FIG. 15 is a frontal view of a storage cell array with the positioning of the top and bottom fiducials for each column as shown in FIG. 13.

Referring to FIG. 14, the process for finding each cell stack includes the following steps.

Nominal X and Y locations are used to position the tape library robotics in an area in which the fiducial exists in open space. A two pass vertical sweep is made with the calibration sensor in order to determine the Y center. Once the Y center is determined, the robotic is placed in that vertical center and a two pass horizontal sweep is made to determine the X center. Since it is impossible to stop the robot at the exact transition of the sensor, the two pass scan is performed and an average is taken to provide a more precise location of the fiducial center. The vertical center is calculated as YCenter= (Et(Pass1)+Eb(Pass)+Eb(Pass2)+Et(Pass2))/4. The horizontal center is calculated as Xcenter=(El(Pass1)+Er(Pass)+Er(Pass2)+El(Pass2))/4.

Once the top and bottom column fiducial centers are determined, the precise location of each cell can then be determined. First the vertical pitch of each cell can be calculated by:

*Y*pitch=((*Y*TopCenter−Offset of Top Cell to Top Fiducial)−(*Y*BotCenter+Offset of Bottom Cell to Bottom Fiducial))/Number of Cells The relative mast tilt of the robot is determined by Mast Tilt=(Cell Number*"*Y*Pitch"*(*X*BottomCenter−*X*TopCenter))/(*Y*TopCenter−*Y*BottomCenter)

The relative mast tilt of the robot is then applied to the calculation of the X position of the cell by the following:

*X*CellCenter=*X*TopCenter+Mast Tilt

The Y position of the cell is calculated by the following:

*Y*CellCenter=(*Y*TopCenter−*Y*Offset at Top Cell to Top Fiducial)−((Cell Number−1)**Y*Pitch)+*Y*Offset of picker palm to sensor The fiducial target 49 at the top and bottoms of each storage column cell stack 70 are meant to be just black holes in space that can be found by using a nominal location of this hole. They are positioned on both the top and bottom of each storage column, drive, and I/O station. The process for storage columns, drives, and I/O stations are nearly the same except that drives only contain one fiducial. The fiducial located on the storage columns will be discussed here. They are shown in FIGS. 12, 13, 14, 15, and 16. Once the top and bottom fiducial centers are located, then any absolute location of the storage cells can be resolved. A hunting process is also used in order to allow a large tolerance off the initial or nominal locations. This concept eliminates a strict manufacturing build spec. This hunting process allows, for example, + or −9 mm off the nominal fiducial location. The fiducial center find process is as follows.

Figure 16:
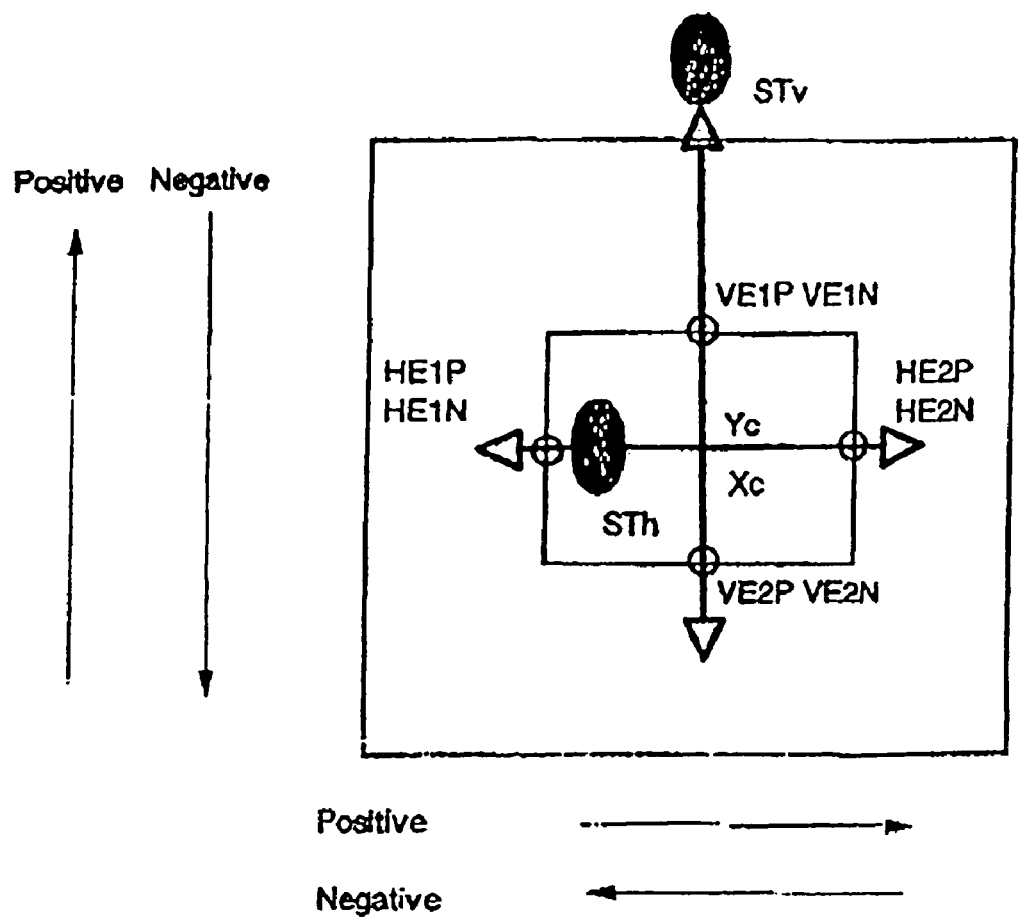
FIG. 16 shows the scan procedure for the column fiducials of FIG. 15.

Position robot calibration sensor to top column fiducial position Stv from FIG. 16. This is 14 mm above the nominal Y location of the fiducial. This allows for a wider Y window in the top column fiducial. The robot does a continuous motion downward until the calibration sensor switches to the on state. This is the indication that the optical spot is now positioned on the fiducial reflective space. The robot starts a negative sweep downward while monitoring the calibration sensor. This process monitors the state change of the sensor from on to off and back to the on state. This registers the state change of the fiducial hole edges as VE1N (off) and VE2N (on). These two edges found in the negative sweep are then compared to a window of 2 to 8 mm. This guarantees that this is the fiducial hole vertically. If the edges are determined not to be within the fiducial limits or a VExN edge is not found, then the robot is once again positioned to STv with a +3 mm offset in the X position and the scan process is repeated. This process is called hunting for the fiducial hole in the negative Y direction and is then −3 mm in the X direction continued with increments of +3 mm in the X direction. If VE1N and VE2N are found to within the fiducial hole limits, then a positive scan is made upward with the robot monitoring for fiducial edges VE2P and VE1P. No hunting is performed in the Y positive direction since it is assumed that we are within the fiducial hole. Now an average of the locations of these four edges can be performed to determine the Y center (Yc) of the fiducial hole.

Once the Y center (Yc) is found, then the robot is positioned to position STh from FIG. 16. The X location of STh is derived as being the nominal X position+11 mm. This should start the scanning of the robot from within the fiducial hole. The robot then creeps in the negative direction until the calibration sensor indicates the on state. This state now puts the robot sensor on the reflective space of the fiducial. The robot starts a positive sweep across the fiducial while monitoring the calibration sensor. This process monitors the state change of the sensor from on to off and back to the on state. This registers the state change of the fiducial hole edges as HE1P (off) and HE2P (on). These two edges found in the positive sweep are then compared to be with a window of 6 to 15 mm. This guarantees that this is the fiducial hole horizontally. If HE1P and HE2P are found to be within the fiducial hole limits, then a negative scan is made across the fiducial with the robot monitoring for fiducial edges HE2N and HE1N. Now an average of these the locations of these four edges can be performed to determine the X center (Xc) of the fiducial hole.

The vertical center of the column fiducial is calculated as the following:

$$Yc=(YE1P+YE2P+YE1N+YE2N)/4$$

The horizontal center of the column fiducial is calculated as the following:

$$Xc=(HE1P+HE2P+HE1N+HE2N)/4$$

This process is repeated for the bottom column calibration target 49. In order to get a more precise location of the STv position of the bottom fiducial, the delta of the nominal top fiducial is used to obtain a more precise starting location. These then eliminate unnecessary hunting in the Y direction. The Yc and Xc (Y Center and X Center) for both the top and bottom column fiducials are saved for future cell locations as the following in FIG. 15. XTnYTn and XBnYBn is found by the calibration sensor, whereas X is the X center location, Y is the Y center location, T is the top column fiducial, B is the bottom column fiducial and n is the column number or cell number. Since environment changes tend to change the height of columns, this process allows the dynamic calculation of the Y pitch of the storage cell locations based upon the top and bottom fiducial location data. Y pitch as shown in FIG. 12 is calculated as the following:

$$YPitch=((YTn-YTOffset)-(Ybn+YBOffset))/NumCells,$$

whereas Ytn is the stored Y location of the top column n fiducial, Ybn is the stored Y locations of the bottom column n fiducial, YTOffset is the Y offset from the top column fiducial to the first storage cell, YBOffset is the Y offset from the bottom column fiducial to the last storage cell, and NumCells is the number of storage cells within the storage column.

Since manufacturing build tolerances vary from one machine to another, the X location of the top storage cell may be different than that of the bottom storage cell. This may be the result of the different placements of the storage array within the frame side. Also the vertical mast 18 of the picker assembly may lean or tilt as shown in FIG. 13 and this may cause the X location of the top column fiducial to be different from that of the bottom column fiducial. In both cases, this mast tilt can be calculated based upon the top and bottom fiducial location data as the following:

$$MastTilt=(NumCells*YPitch*(XBn-XTn))/(YTn-YBn)$$

whereas NumCells is the number of storage cells within the storage column, Ypitch is the calculated pitch of the storage cells as determined above, Xbn is the bottom column fiducial X location, Xtn is the top column fiducial X location, Ytn is the top column fiducial Y location, and Ybn is the bottom column fiducial Y location.

Once knowing the top and bottom X Y locations, mast tilt of the gripper assembly and frame array, and the Ypitch of the storage cells, an absolute storage cell location can be derived from the following:

$$YCoord=(YTn-YS)-(Cell\#*YPitch)-Yhand \text{ whereas}$$

Ytn is the top column fiducial location, YS is the Y offset from the top column fiducial to the first storage cell, Cell# is the cell number with the storage column in which the absolute location is to be derived, Ypitch is the Y pitch of the storage cells with the storage column, and the Yhand is the offset from the center of the gripper mechanism to the calibration sensor as shown in FIG. 12.

$$Xcoord=XTn+MastTilt+Xh \text{ whereas}$$

XTN is the top column fiducial location and MastTilt is derived as described above.

Figure 17:
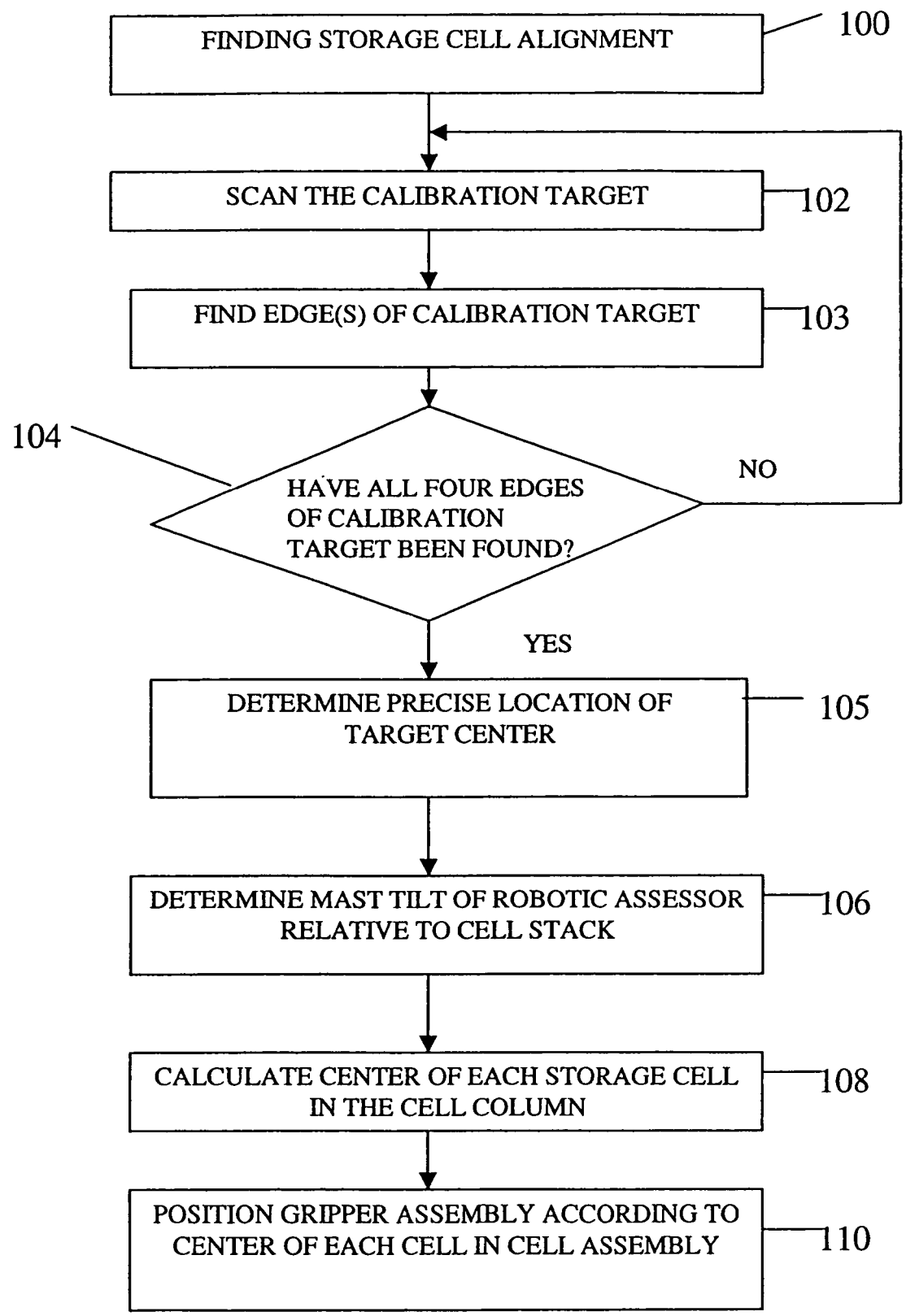
FIG. 17 is a flowchart of the process steps to precisely position the gripper assembly to each storage cell.

The process for precisely positioning the gripper assembly relative to each cell in the cell assembly, therefore, is shown in FIG. 17. The process for finding the storage cell alignment as discussed above for FIGS. 12 to 16, blocks 100, starts with the scanning of the calibration target as shown in block 102 to find the four edges of the calibration target as shown in block 103. the precise location of the target center as shown in block 104. The next step in block 106 determines the mast tilt of the robotic accessor relative to the cell stack. In block 108, the center of each storage cell in the cell column is calculated. Then, with the advantages of the calibration targets as shown in block 110, the gripper assembly can be accurately positioned according to the center of each cell in the cell assembly.

While the invention has been particularly shown and described with reference to preferred embodiments thereof, it will be understood by those skilled in the art that various changes in form and detail may be made therein without departing from the spirit and scope of the invention. For instance, the back plate may be made of steel for a rigid construction and the "T" shaped openings in the back plate 22 can be formed by a numerical controlled process control computer which will provide accurate positioning of the "T" shaped openings 30 and 31 relative to each other and relative to the openings which hold the shelf 28 and the spring 38. The cell blocks, likewise, can be made of plastic or any strong material to hold the shape for storing the cartridges within. The appended claims are the only limitation on the described invention.

We claim:

1. A storage cell array, comprising:
   a back plate having a first end, an opposing second end, a first surface, and an opposing second surface;
   two end cell blocks, wherein a first end cell block is removeably disposed on said first surface in a first orientation adjacent said first end, and wherein a second end cell block is removeably disposed on said first surface in a second orientation adjacent said second end, wherein said first end cell block is formed identically to said second end cell block; and
   (N) intermediate cell blocks removeably disposed on said first surface between said first end cell block and said second end cell block to form a continuous column, wherein said column comprises (N)+1 storage cavities;
   a shelf disposed on said first surface adjacent said first end, wherein said first end cell block is disposed adjacent said shelf and between said shelf and said second end; and
   a spring attached to said back plate and extending outwardly therefrom and pressing against said second end cell block such that said spring pushes said column against said shelf;
   wherein said back plate is formed to include a plurality of apertures, wherein each of said plurality of apertures extends through said first surface and through said second surface, and wherein said first end cell block, said second end cell block, and each of said one or more intermediate cell blocks, comprise a rear portion releaseably attached to said back plate and two sides attached to, and extending outwardly from, said rear portion in a first direction, wherein each rear portion further comprises one or more protrusions extending outwardly therefrom in a second direction, wherein each of said one or more protrusions is removeably inserted in a different one of said plurality of apertures.

2. The storage cell array of claim 1, wherein each of said sides comprises:
   a first edge and an opposing second edge;
   one or more projections extending outwardly from said first edge in a third direction, wherein said third direction is orthogonal to said first direction and to said second direction;
   wherein each of said side portions is formed to include one or more mating locations disposed on said second edge; and
   wherein each projection disposed on one cell block is removeably inserted in a mating location disposed on an adjacent cell block.

3. The storage cell array of claim 1, wherein each of said plurality of protrusions has a "T" shape, and wherein each of said apertures has a "T" shape, such that any one of said protrusions can be removeably inserted in any one of said apertures.

4. The storage cell array of claim 1, further comprising:
   a first calibration target disposed on said first end cell block; and
   a second calibration target disposed on said second end cell block.

5. The storage cell array of claim 1, further comprising information continuously disposed on said first surface between said first end of said back plate and said second end of said back plate.

6. The storage cell array of claim 5, wherein said information comprises a bar code.

7. A storage cell array, comprising:
   a back plate having a first end, an opposing second end, a first surface, and an opposing second surface;
   two end cell blocks, wherein a first end cell block is removeably disposed on said first surface in a first orientation adjacent said first end, and wherein a second end cell block is removeably disposed on said first surface in a second orientation adjacent said second end, wherein said first end cell block is formed identically to said second end cell block;
   (N) intermediate cell blocks removeably disposed on said first surface between said first end cell block and said second end cell block to form a continuous column, wherein said column includes (N)+1 storage cavities;
   a shelf disposed on said first surface adjacent said first end, wherein said first end cell block is disposed adjacent said shelf and between said shelf and said second end;
   a spring attached to said back plate and extending outwardly therefrom and pressing against said second end cell block such that said spring pushes said column against said shelf;
   a first calibration target disposed on said first end cell block;
   a second calibration target disposed on said second end cell block.;
   a bar code continuously disposed on said first surface between said first end of said back plate and said second end of said back plate;
   wherein said back plate is formed to include a plurality of apertures, wherein each of said plurality of apertures extends through said first surface and through said second surface, and wherein each of said plurality of apertures has a "T" shape;
   wherein said first end cell block, said second end cell block, and each of said one or more intermediate cell blocks, comprise a rear portion releaseably attached to said back plate and one or more sides attached to, and extending outwardly from, said rear portion in a first direction, wherein each rear portion further comprises one or more protrusions extending outwardly therefrom in a second direction, wherein each of said one or more protrusions is removeably inserted in a different one of said plurality of apertures, wherein each of said plurality of protrusions has a "T" shape;
   wherein each of said sides comprises, a first edge and an opposing second edge, one or more projections extending outwardly from said first edge in a third direction, and wherein said third direction is orthogonal to said first direction and to said second direction, and wherein each of said sides is formed to include one or more mating locations disposed in said second edge, such that each projection disposed on one cell block is removeably inserted in a mating location disposed in an adjacent cell block.

8. A data storage and retrieval system, comprising:
one or more storage cell arrays, wherein each of said storage cell arrays comprises:
a back plate having a first end, an opposing second end, a first surface, and an opposing second surface;
two end cell blocks, wherein a first end cell block is removeably disposed on said first surface in a first orientation adjacent said first end, and wherein a second end cell block is removeably disposed on said first surface in a second orientation adjacent said second end, wherein said first end cell block is formed identically to said second end cell block;
(N) intermediate cell blocks removeably disposed on said first surface between said first end cell block and said second end cell block to form a continuous column;
a shelf disposed on said first surface adjacent said first end, wherein said first end cell block is disposed adjacent said shelf and between said shelf and said second end; and
a spring attached to said back plate and extending outwardly therefrom and pressing against said second end cell block such that said spring pushes said column against said shelf;
wherein said back plate is formed to include a plurality of apertures, wherein each of said plurality of apertures extends through said first surface and through said second surface, and wherein said first end cell block, said second end cell block, and each of said one or more intermediate cell blocks, comprise a rear portion releaseably attached to said back plate and two sides attached to, and extending outwardly from, said rear portion in a first direction, wherein each rear portion further comprises one or more protrusions extending outwardly therefrom in a second direction, wherein each of said one or more protrusions is removeably inserted in a different one of said plurality of apertures.

9. The data storage and retrieval system of claim 8, wherein each of said sides comprises:
a first edge and an opposing second edge;
one or more projections extending outwardly from said first edge in a third direction, wherein said third direction is orthogonal to said first direction and to said second direction;
wherein each of said side portions is formed to include one or more mating locations disposed on said second edge; and
wherein each projection disposed on one cell block is removeably inserted in a mating location disposed on an adjacent cell block.

10. The data storage and retrieval system of claim 8, wherein each of said plurality of protrusions has a "T" shape, and wherein each of said apertures has a "T" shape, such that any one of said protrusions can be removeably inserted in any one of said apertures.

11. The data storage and retrieval system of claim 8 wherein each of said one or more storage cell arrays further comprises:
a first calibration target disposed on said first end cell block; and a second calibration target disposed on said second end cell block.

12. The data storage and retrieval system of claim 11, further comprising one or more accessors moveably disposed therein, wherein one or more of said one or more accessors comprises:
an emitter, wherein said emitter is capable of providing a beam;
a sensor, wherein said sensor is capable of detecting said beam;
wherein said first calibration target is capable of reflecting said beam, and wherein said second calibration target is capable of reflecting said beam.

13. The data storage and retrieval system of claim 12, wherein each of said one or more storage cell arrays further comprises information continuously disposed on said first surface between said first end of said back plate and said second end of said back plate.

14. The data storage and retrieval system of claim 13, wherein said information comprises a bar code.

15. The data storage and retrieval system of claim 14, wherein said one or more accessors further comprises a bar code reader.

16. The data storage and retrieval system of claim 8, wherein said column includes (N)+1 storage cavities.

17. The data storage and retrieval system of claim 16, further comprising one or more portable information storage media, wherein one or more of said one or more portable information storage media are individually removeably disposed in one or more of said storage cavities.

18. The data storage and retrieval system of claim 17, wherein one or more of said one or more portable information storage media comprise a magnetic tape disposed in a portable tape cartridge.

19. The data storage and retrieval system of claim 17, wherein said data storage and retrieval system is capable of communication with a host computer.

20. A data storage and retrieval system, comprising:
a back plate having a first end, an opposing second end, a first surface, and an opposing second surface;
two end cell blocks, wherein a first end cell block is removeably disposed on said first surface in a first orientation adjacent said first end, and wherein a second end cell block is removeably disposed on said first surface in a second orientation adjacent said second end, wherein said first end cell block is formed identically to said second end cell block;
(N) intermediate cell blocks removeably disposed on said first surface between said first end cell block and said second end cell block to form a continuous column, wherein said column includes (N)+1 storage cavities;
a shelf disposed on said first surface adjacent said first end, wherein said first end cell block is disposed adjacent said shelf and between said shelf and said second end;
a spring attached to said back plate and extending outwardly therefrom and pressing against said second end cell block such that said spring pushes said column against said shelf;
a first calibration target disposed on said first end cell block;
a second calibration target disposed on said second end cell block;
a bar code continuously disposed on said first surface between said first end of said back plate and said second end of said back plate;

one or more accessors moveably disposed therein, wherein one or more of said one or more accessors comprises:

an emitter, wherein said emitter is capable of providing a beam;

a sensor, wherein said sensor is capable of detecting said beam;

and a bar code reader;

wherein said first calibration target is capable of reflecting said beam, and wherein said second calibration target is capable of reflecting said beam;

wherein said back plate is formed to include a plurality of apertures, wherein each of said plurality of apertures extends through said first surface and through said second surface, and wherein each of said plurality of apertures has a "T" shape;

wherein said first end cell block, said second end cell block, and each of said one or more intermediate cell blocks, comprise a rear portion releaseably attached to said back plate and one or more sides attached to, and extending outwardly from, said rear portion in a first direction, wherein each rear portion further comprises one or more protrusions extending outwardly therefrom in a second direction, wherein each of said one or more protrusions is removeably inserted in a different one of said plurality of apertures, wherein each of said plurality of protrusions has a "T" shape;

wherein each of said sides comprises a first edge and an opposing second edge, one or more projections extending outwardly from said first edge in a third direction, and wherein said third direction is orthogonal to said first direction and to said second direction, and wherein each of said sides is formed to include one or more mating locations disposed in said second edge, such that each projection disposed on one cell block is removeably inserted in a mating location disposed on an adjacent cell block.

21. A method of forming a storage cell array comprising the steps of:

providing a first end cell block and a second end cell block, wherein said first end cell block is formed identically to said second end cell block;

providing (N) intermediate cell blocks;

providing a back plate having a first end and a second end;

releaseably said first end cell block in a first orientation to said back plate adjacent said first end;

releaseably said second end cell block in a second orientation to said back plate adjacent said second end;

releaseably attaching each of said (N) intermediate cell blocks to said back plate between said first end cell block and said second end cell block to form a continuous column;

forming (N)+1 storage cavities;

providing a shelf;

attaching said shelf adjacent said first end such that said first end cell block is disposed adjacent said shelf and between said shelf and said second end;

providing a spring; attaching said spring to said back plate such that said spring presses against said second end cell block;

pushing said column against said shelf;

forming said back plate to include a plurality of apertures;

disposing one or more protrusions on each of said end cell blocks;

removeably inserting each of said one or more protrusions into a different one of said plurality of apertures.

22. The method of claim 21, further comprising the step of disposing one or more protrusions on each of said intermediate cells blocks.

23. The method of claim 22, wherein each of said (N) intermediate cell blocks is disposed adjacent two cell blocks, wherein those two adjacent cell blocks comprise either two other intermediate cell blocks or one of said end cell blocks and one of said intermediate cell blocks, further comprising the step of releaseably attaching each of said (N) intermediate cell blocks to each of the two adjacent cell blocks.

24. A method of forming a storage cell array, comprising the steps of:

providing a back plate having a first end and a second end, wherein said back plate is formed to include a of fixturing apertures;

providing a shelf;

attaching said shelf adjacent said first end;

providing a first end cell block and a second end cell block, wherein each of said two end cell blocks comprises one or more protrusions, and wherein said first end cell block is formed identically to said second end cell block;

releaseably attaching said first end cell block in a first orientation to said back plate adjacent said first end by removeably inserting each of the one or more protrusions disposed on that first end cell block into a different one of said plurality of apertures such that said first end cell block is disposed adjacent said shelf and between said shelf and said second end;

releaseably attaching said second end cell block in a second orientation to said back plate adjacent said second end by removeably inserting each of the one or more protrusions disposed on that second end cell block into a different one of said plurality of apertures;

providing (N) intermediate cell blocks, wherein each of said (N) intermediate cell blocks comprises one or more protrusions;

releaseably attaching each of said (N) intermediate cell blocks to said back plate between said first end cell block and said second end cell block to form a continuous column by removeably inserting each of the one or more protrusions disposed on each of said (N) intermediate cell blocks into a different one of said plurality of fixturing apertures;

forming (N)+1 storage cavities;

providing a spring;

attaching said spring to said back plate such that said spring presses against said second end cell block;

pushing said column against said shelf;

wherein each of said (N) intermediate cell blocks is disposed adjacent two cell blocks, wherein those two adjacent cell blocks comprise two other intermediate cell blocks or one of said two end cell blocks and one of said intermediate cell blocks;

releaseably attaching each of said (N) intermediate cell blocks to each of the two adjacent cell blocks.

25. A method to store portable information storage media, comprising the steps of:

providing one or more portable information storage media;

providing a first end cell block and a second end cell block, wherein said first end cell block is formed identically to said second end cell block;

providing (N) intermediate cell blocks;
providing a back plate having a first end and a second end, wherein said back plate is formed to include a plurality of apertures;
releaseably attaching said first end cell block in a first orientation to said back plate adjacent said first end;
releaseably attaching said second end cell block in a second orientation to said back plate adjacent said second end;
releaseably attaching each of said (N) intermediate cell blocks to said back plate between said first end cell block and said second end cell block to form a continuous column;
forming (N)+1 storage cavities; and
removeably disposing up to (N)+1 of said one or more portable information storage media in said storage cavities;
providing a shelf;
attaching said shelf adjacent said first end such that said first end cell block is disposed adjacent said shelf and between said shelf and said second end;
providing a spring;
attaching said spring to said back plate such that said spring presses against said second end cell block; and
pushing said column against said shelf;
forming said back plate in include a plurality of fixturing apertures;
disposing one or protrusions on each of said end cell blocks;
removeably inserting each of said one or more protrusions into a different one of said plurality of apertures.

26. The method of claim 25, further comprising the step of disposing one or more protrusions on each of said intermediate cells blocks.

27. The method of claim 26, wherein each of said (N) intermediate cell blocks is disposed adjacent two cell blocks, wherein those two adjacent cell blocks comprise two other intermediate cell blocks or one of said two end cell blocks and one of said intermediate cell blocks, further comprising the step of releaseably attaching each of said (N) intermediate cell blocks to each of the two adjacent cell blocks.

* * * * *